United States Patent [19]

Antonov

[11] Patent Number: 5,263,906
[45] Date of Patent: Nov. 23, 1993

[54] MECHANICAL AUTOMATIC TRANSMISSION DIRECTLY RESPONSIVE TO TORQUE

[75] Inventor: Roumen Antonov, Paris, France

[73] Assignee: Antonov Automotive North America B.V., Rotterdam, Netherlands

[21] Appl. No.: 780,671

[22] Filed: Oct. 18, 1991

[30] Foreign Application Priority Data

Aug. 30, 1990 [FR] France ................................. 91 10784
Oct. 18, 1990 [FR] France ................................. 90 12901

[51] Int. Cl.⁵ ................... F16H 59/14; F16H 59/38; F16H 1/46; B60K 17/08
[52] U.S. Cl. ................... 475/257; 74/336 R; 74/337; 475/258; 475/261; 475/262; 475/264; 475/266; 475/269; 475/293; 475/298; 475/300; 475/320; 475/330
[58] Field of Search ...................... 74/336 R, 337; 192/56 R, 105 B, 105 BA; 475/257, 258, 261, 262, 264, 266, 269, 293, 296, 297, 298, 300, 318, 320, 321, 322, 330

[56] References Cited

U.S. PATENT DOCUMENTS

| | | | |
|---|---|---|---|
| 1,870,649 | 3/1932 | Rawson | 192/105 BA |
| 1,950,163 | 3/1934 | Cotterman | 192/105 BA X |
| 2,148,243 | 2/1939 | Nahigyan et al. | 192/105 BA |
| 2,152,039 | 3/1939 | Giesen | 74/262 |
| 2,163,192 | 6/1939 | Cotterman | 475/257 |
| 2,201,848 | 5/1940 | Cotterman | 475/257 |
| 2,222,766 | 11/1940 | Giesen | 74/260 |
| 2,313,132 | 3/1943 | Elliott | 74/337 X |
| 2,373,234 | 4/1945 | Duffield | 475/257 X |
| 2,534,134 | 12/1950 | Kirkpatrick | 192/105 BA X |
| 2,614,798 | 10/1952 | Rubbra | 74/337 X |
| 2,884,812 | 5/1959 | Reis | 74/751 |
| 3,079,814 | 3/1963 | Nickstadt | 74/785 |
| 3,422,703 | 1/1969 | Hawkins et al. | 475/344 |
| 3,459,072 | 8/1969 | Shannon | 475/344 |
| 3,670,597 | 6/1972 | Grattan | 475/300 X |
| 3,762,519 | 10/1973 | Bentley | 192/105 B X |
| 3,916,729 | 11/1975 | Herr | 475/266 X |
| 4,082,011 | 4/1978 | McQuinn et al. | 74/862 |
| 4,368,651 | 1/1983 | Bednar | 475/257 |
| 4,457,185 | 7/1984 | Yoshida et al. | 192/105 B X |
| 4,890,510 | 1/1990 | Inui | 475/249 X |
| 5,073,156 | 12/1991 | Garrett et al. | 475/56 |

FOREIGN PATENT DOCUMENTS

698402 1/1931 France .

Primary Examiner—Leslie A. Braun
Assistant Examiner—David E. Henn
Attorney, Agent, or Firm—Kenyon & Kenyon

[57] ABSTRACT

A multi-speed mechanical automatic transmission has two planetary gear trains, each including a sun gear, planet gears mounted in a planet carrier, and a ring gear. The first planetary gear train provides low gear and direct drive; the second train modifies low gear operation of the first train to provide an intermediate gear operation. The first sun gear is fixed to an input shaft, and the first planet carrier drives an output shaft. The second planet carrier is coupled to rotate the first ring gear in one direction, and free wheels or selectively actuated friction brakes prevent rotation of the first and second ring gears in the opposite direction. The first planetary train has helical gears, and a direct drive clutch selectively couples the first ring gear to the first planet carrier. This clutch is urged toward disengagement, so as to shift the transmission into low gear, by axial movement between the first ring gear and first planet gears in response to a driving torque applied between the gears; it is urged by centrifugal weights toward engagement so as to shift the transmission into direct drive. A second clutch selectively couples the second sun gear to the input shaft or, in the alternative, the second ring gear to the transmission housing. When the second clutch is disengaged, the second planetary train is idle and does not influence low gear operation of the first planetary train. When the second clutch is engaged, the second planetary train drives the first ring gear forward at a reduced speed to provide an overall ratio intermediate between low gear and direct drive.

54 Claims, 15 Drawing Sheets

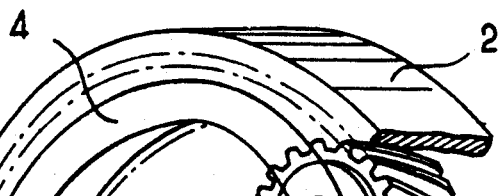
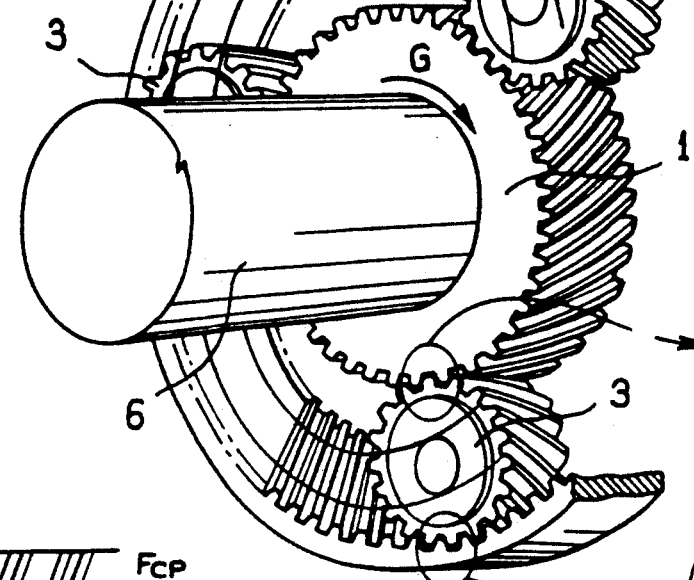
FIG.1
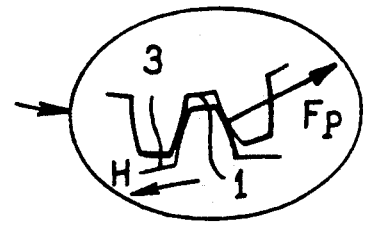
FIG.1a
FIG.1b
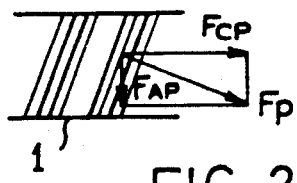
FIG.2
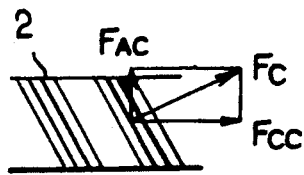
FIG.3
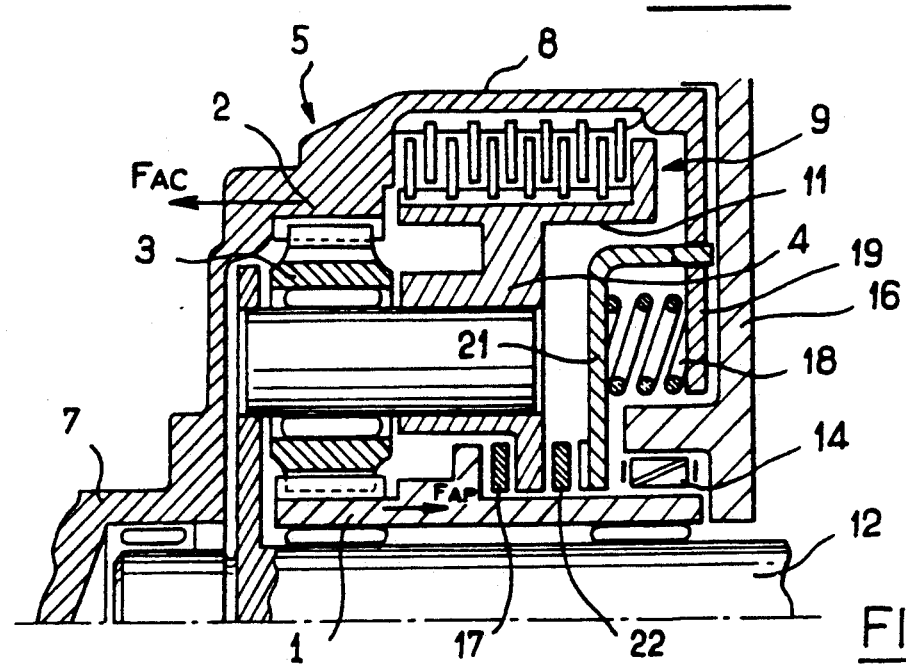
FIG.5

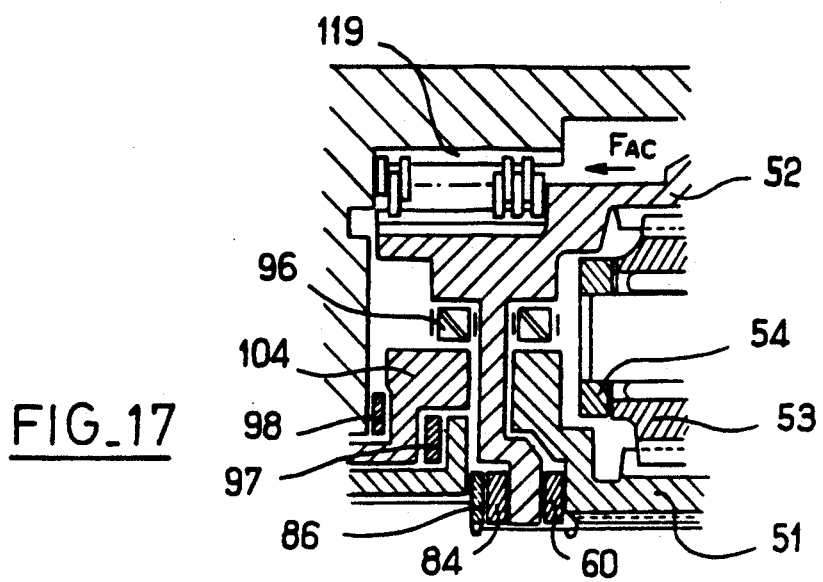
FIG_17
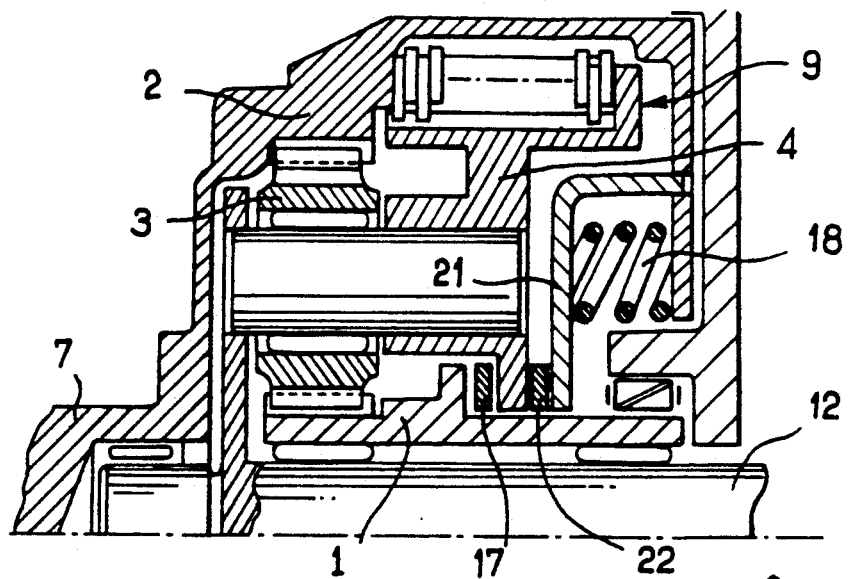
FIG_6
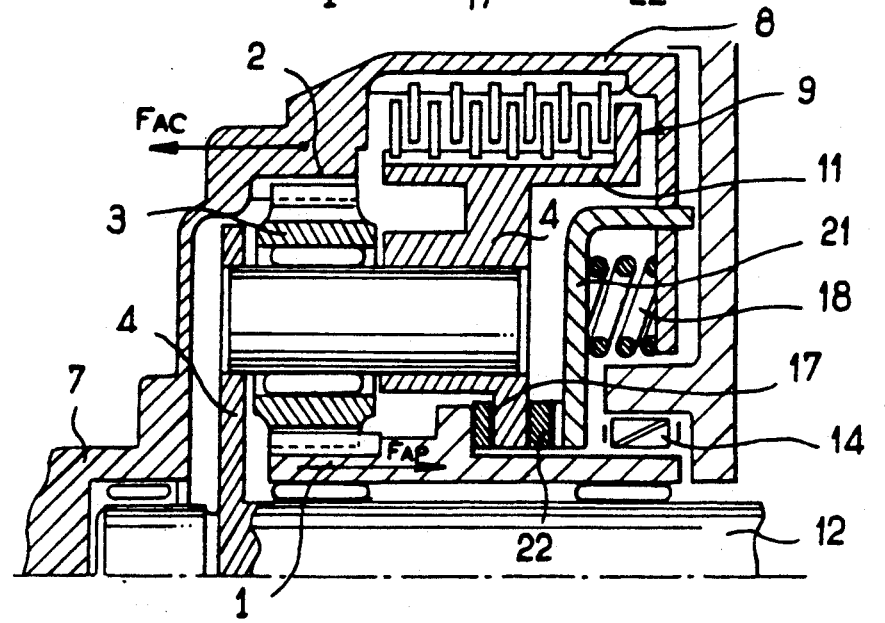
FIG_7

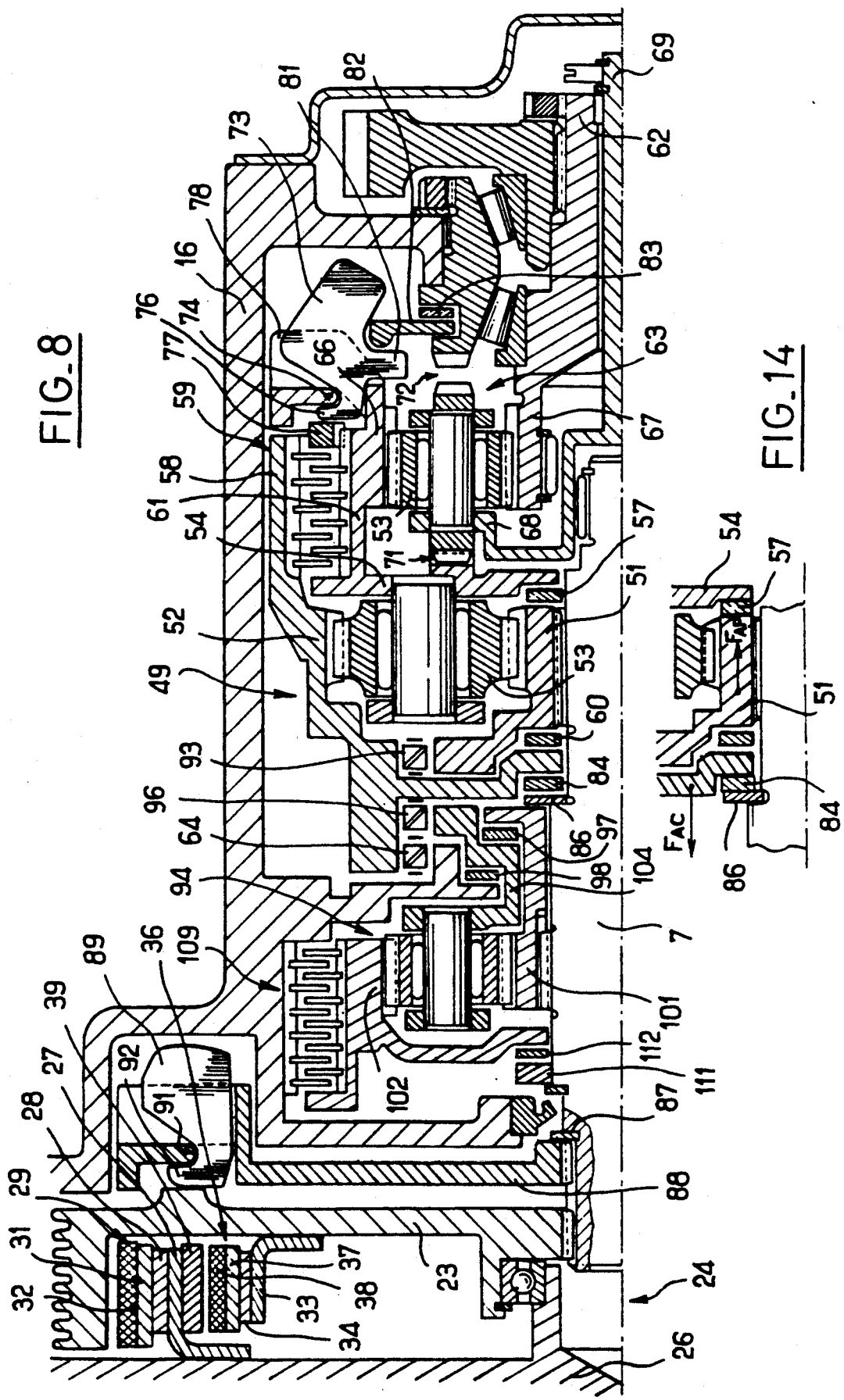
FIG_8
FIG_14

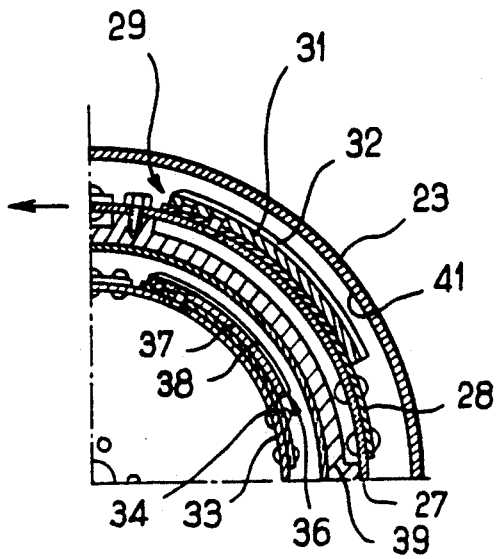
FIG_9
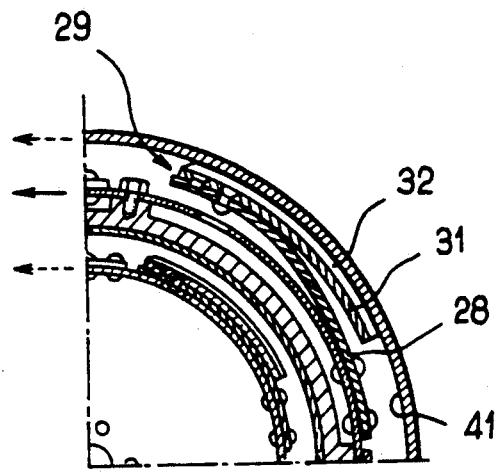
FIG_10
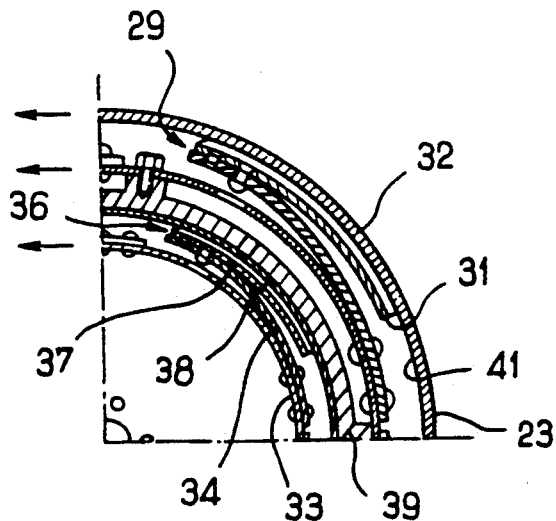
FIG_11
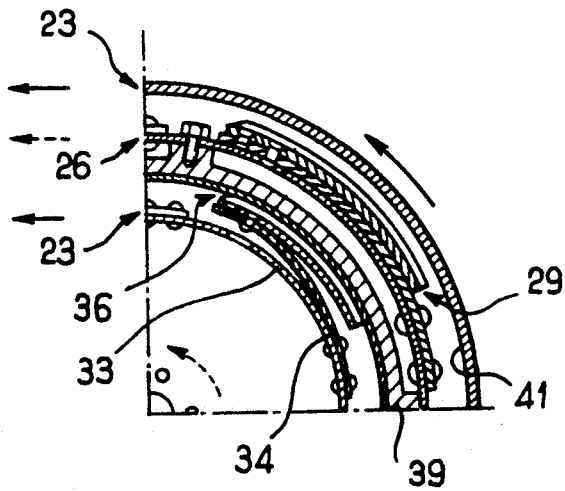
FIG_12

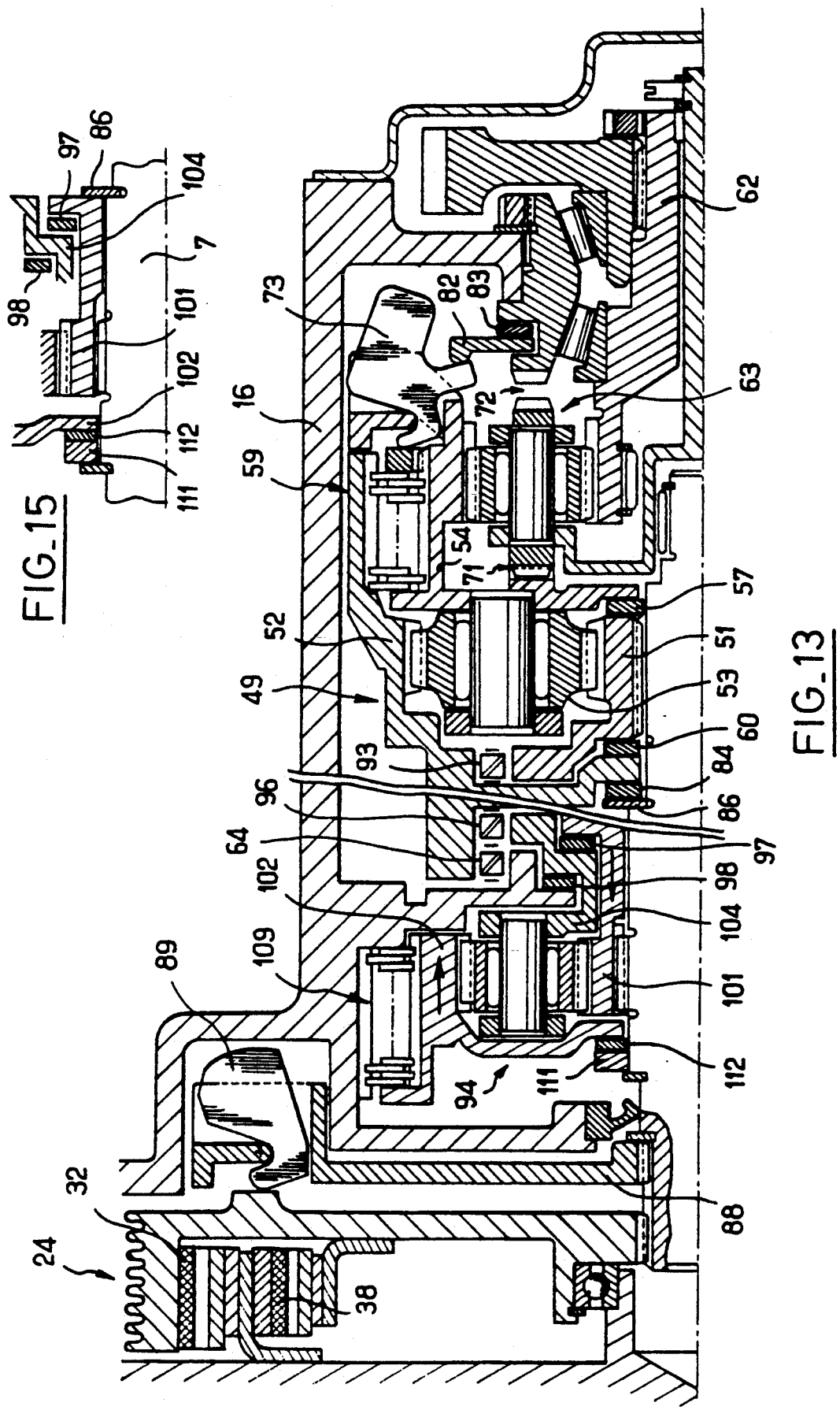
FIG_15
FIG_13

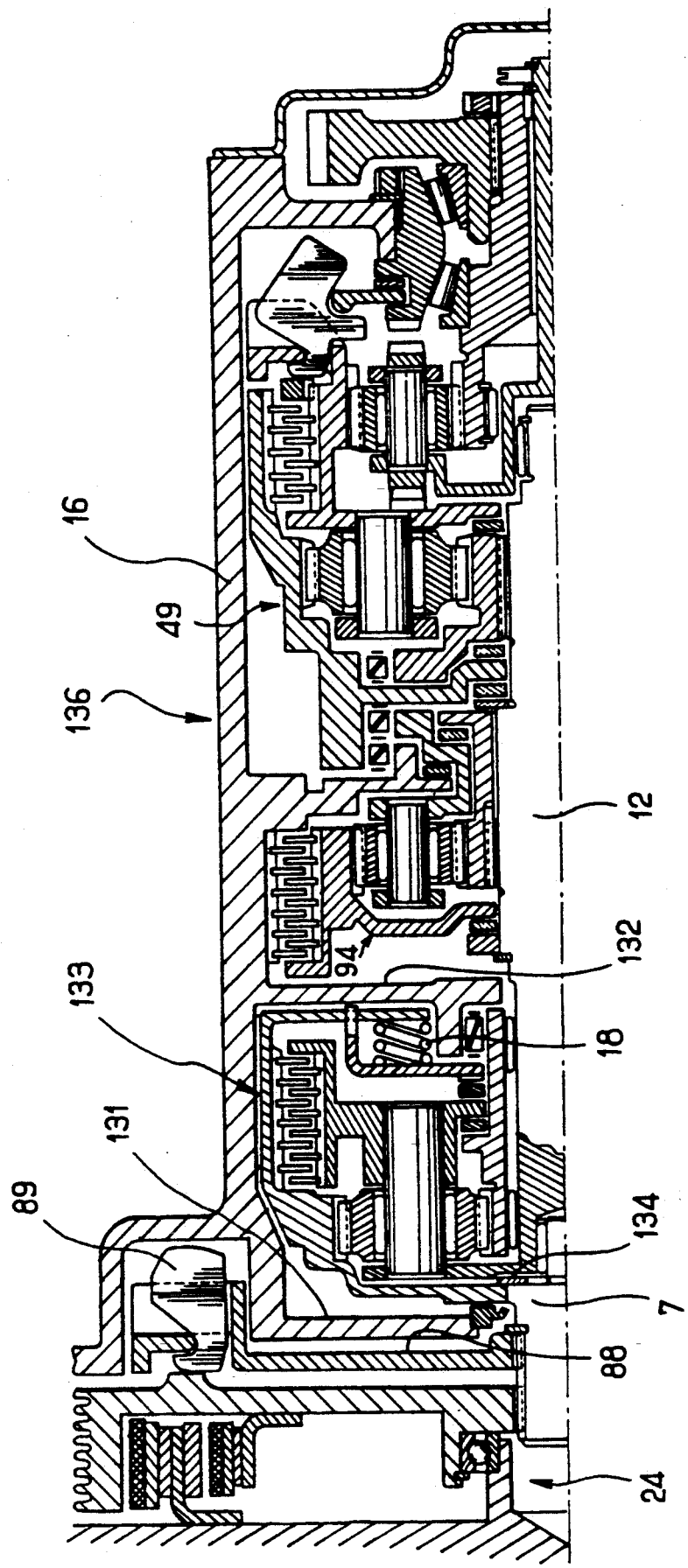
FIG_18

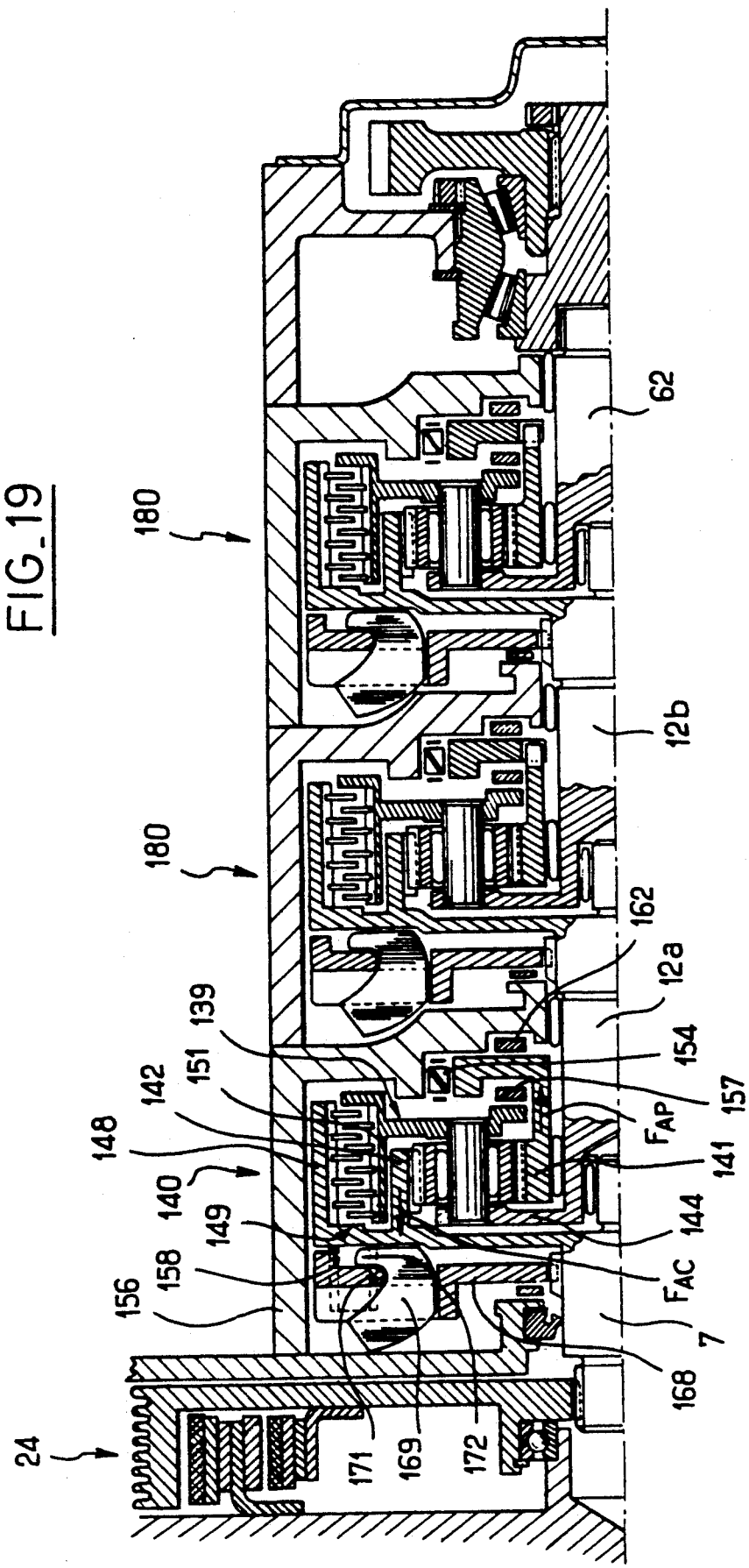
FIG_19

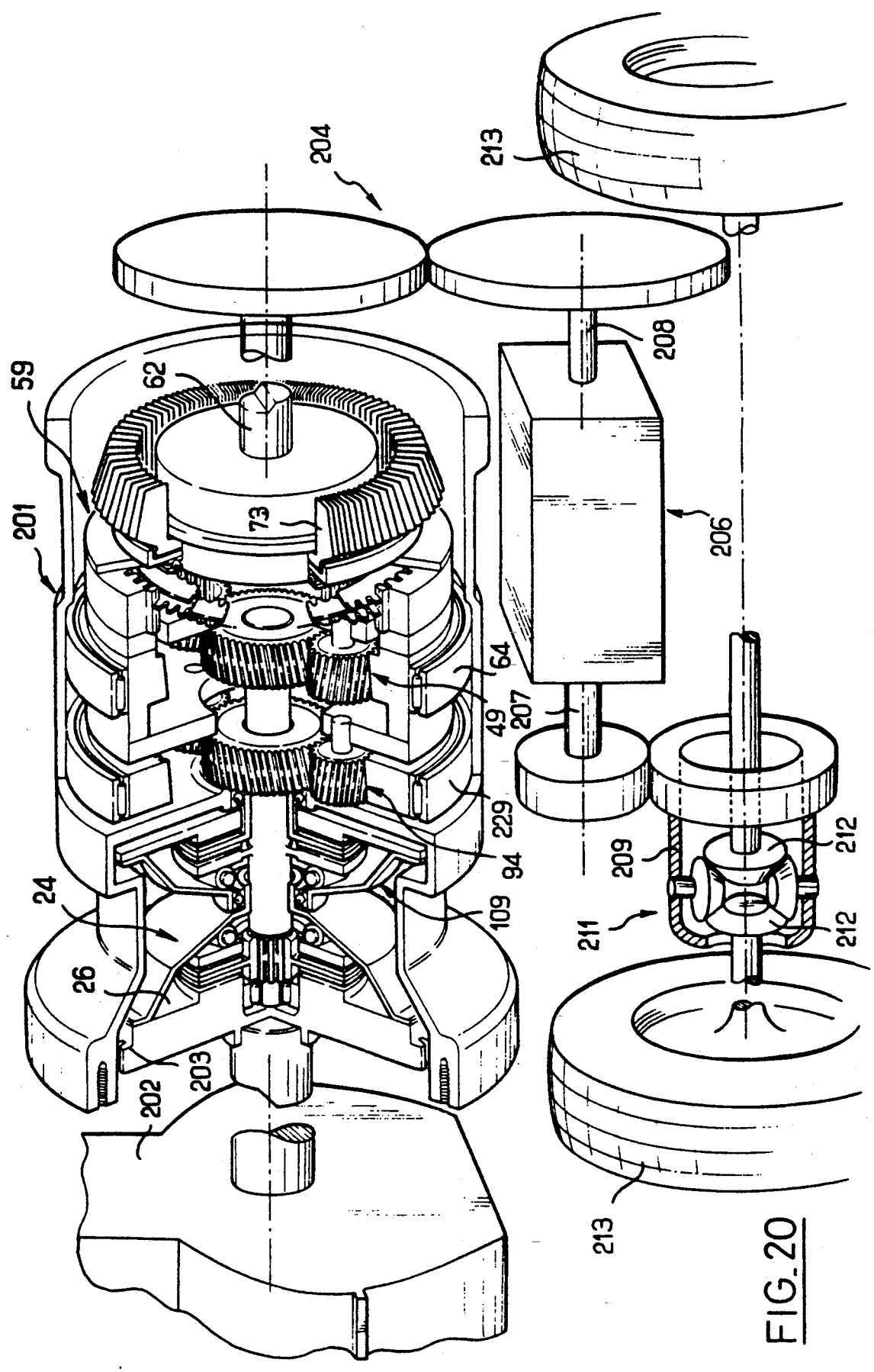

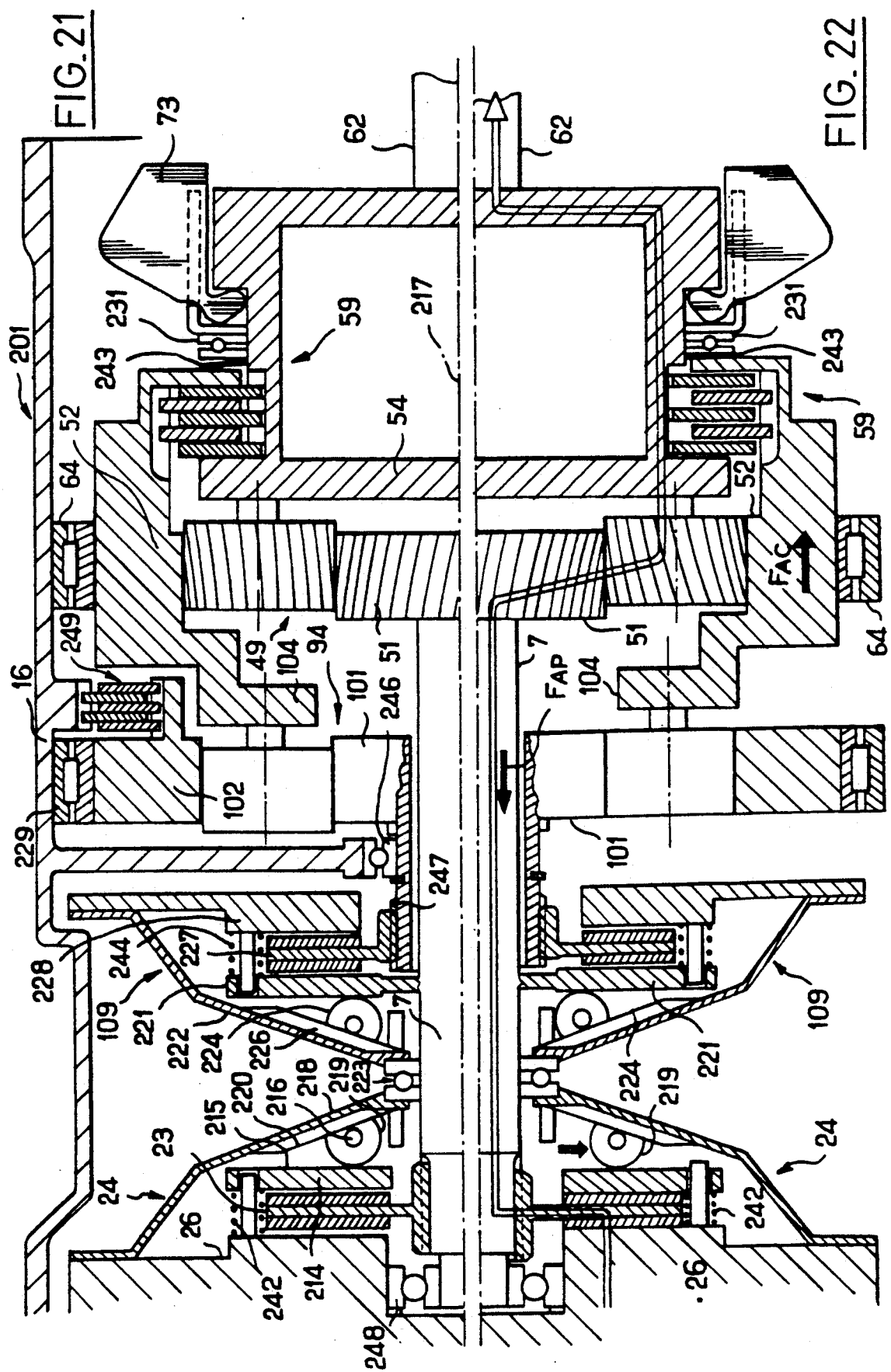

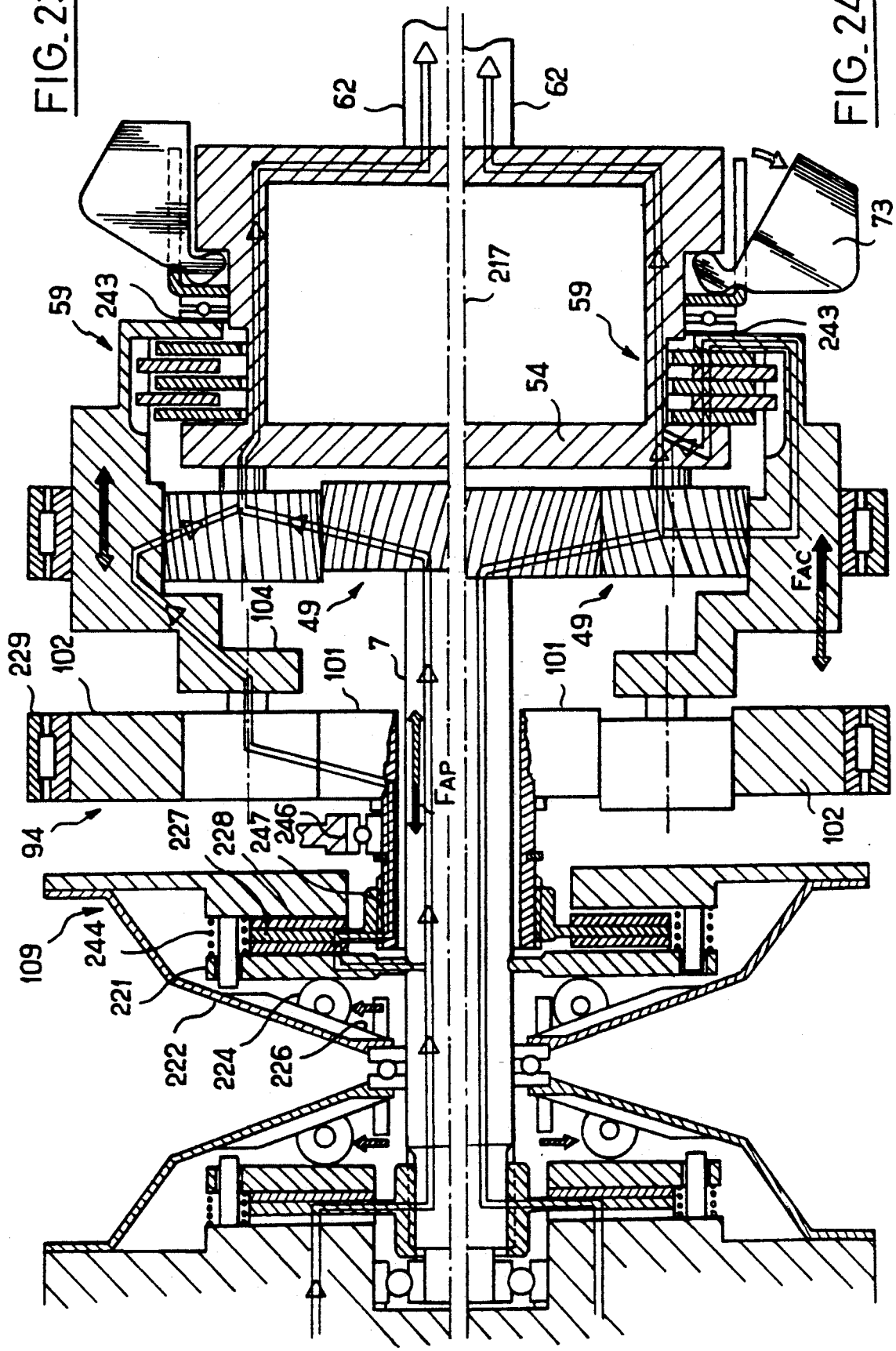

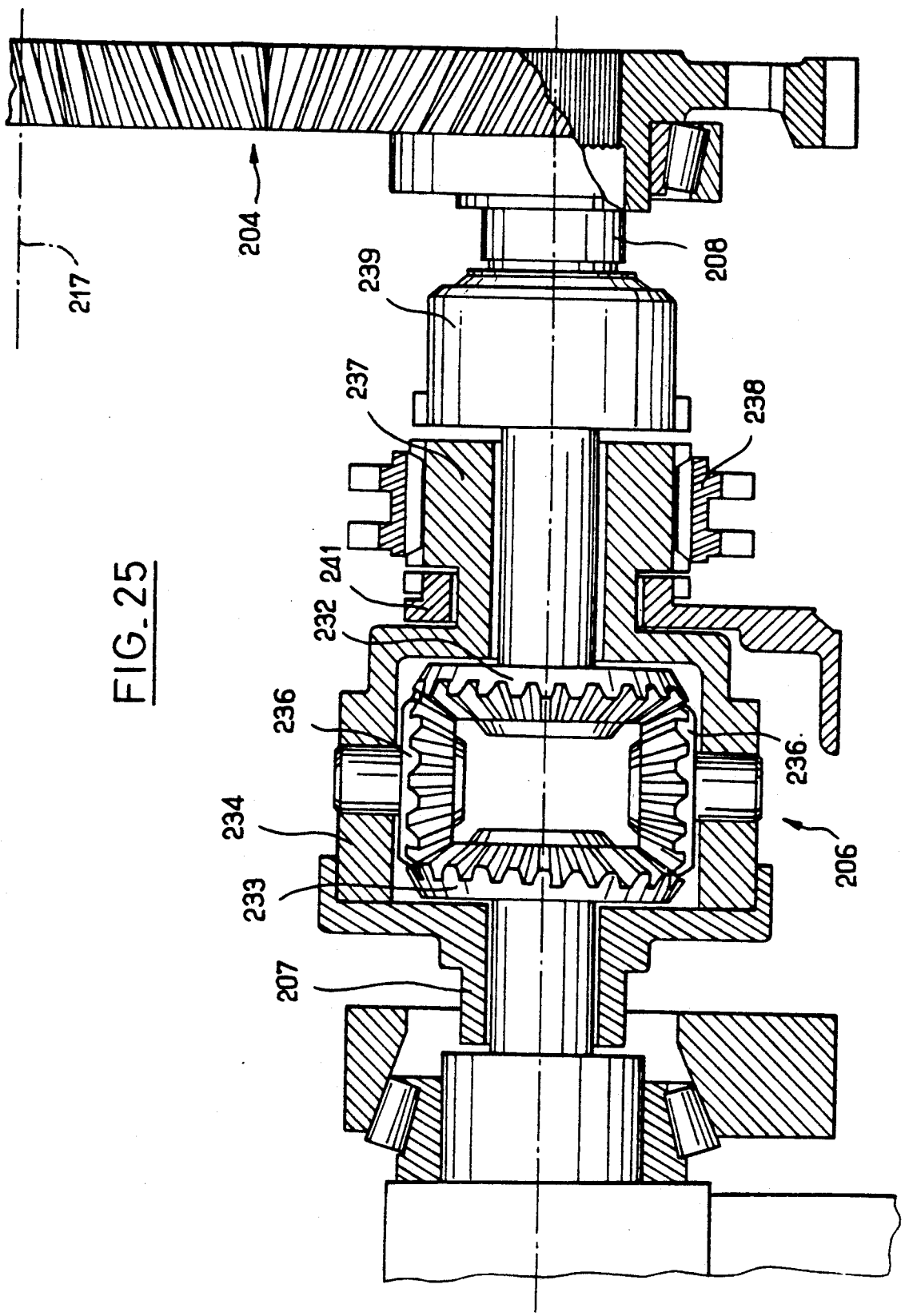
FIG_25

MECHANICAL AUTOMATIC TRANSMISSION DIRECTLY RESPONSIVE TO TORQUE

BACKGROUND OF THE INVENTION

1. Field of the Invention

The present invention concerns automatic transmission devices for automotive vehicles.

2. Background Art

In conventional automatic transmissions, epicyclic gear trains are controlled by a hydraulic power circuit that actuates brake bands or multidisk clutches to effect ratio changes, the power circuit being controlled by either a hydraulic or an electronic control circuit responsive to drive torque, to rotary speed of the engine, and/or to the vehicle speed. The drive torque typically is sensed indirectly by detecting the position of the accelerator pedal. The input from the engine to the automatic transmission is accomplished through a hydraulic torque converter, in which the power of the engine is transmitted by a fluid under pressure when the rotary speed of the engine exceeds an idling speed.

In spite of fifty years of improvements, conventional automatic transmissions are still encumbered to some extent by their original disadvantages: great weight, high cost, mediocre efficiency, and poor performance of the vehicle compared with that obtainable with a manually operated gear box.

SUMMARY OF THE INVENTION

An object of the present invention is to provide an automatic transmission, particularly for automobiles, that is simpler, lighter, less expensive, and more efficient than previously known automatic transmissions.

Another object of the invention is to provide an automatic transmission in which shifting between at least two gear ratios is accomplished by mechanical means directly responsive to both rotary speed and torque;

A further object of the invention is to provide a ratio shifting clutch mechanism for a transmission containing a helical gear train that is directly responsive to torque between two meshing gears of the train and to a rotary speed of the transmission.

Yet another object of the invention is to provide an oil-lubrication system for a mechanically operated disk clutch for an automatic transmission that produces substantial viscous friction prior to complete engagement and that effectively dissipates heat generated during clutch slip operation.

In accordance with one aspect of the invention, the transmission device comprising:

a housing, an input element, an output element elements for the transfer of power between the input and the output, these transfer elements including at least one combination of helical-toothed gears, means for selective coupling between at least some of the said elements, and means sensitive to the transmitted torque for controlling the selective coupling means, is characterized in that the means sensitive to the transmitted torque includes a mutual axial sliding assembly between two helical gears of the combination, the helical gears being subjected to axial forces in accordance with the torque which they transmit by their being meshed in the combination, and means for transmitting the mutual axial displacement of these two gears at least indirectly to the coupling means.

The gears in automotive transmissions usually are helical gears, for reduced vibration and noise of operation. Torque transmitted between two meshed helical gears produces on these gears opposite axial forces which are commonly withstood by bearings having a certain axial load capacity.

According to one feature of the present invention, this axial thrust is used as a measure of the torque to be transmitted. This has considerable advantage since the measurement of the torque to be transmitted is directly available at the very heart of the transmission device without needing specific sensing means. Moreover, this measurement is available in the form of a force whose intensity is generally sufficient to directly control the coupling means, which normally comprise multi-disk clutches or brakes. The invention permits eliminating at least a portion of the control circuit and of the hydraulic power circuit formerly necessary for controlling an epicyclic gear train of an automatic transmission.

In one embodiment of the invention, the combination of gears is mounted functionally between the input element and a friction coupling device constituting, at least in part, the aforementioned coupling means, the two gears of the combination being mounted so that their axial thrust tends to tighten the friction coupling device, means such as an oil bath in which the friction coupling device operates being provided in order to initiate the friction in the friction coupling device.

Such a device permits eliminating the clutch or the torque converter which is usually provided between the engine and the gear box of an automotive vehicle. When the engine is idling, the friction coupling device slips. If the speed of rotation of the input element of the device is made to increase, the slight friction caused by the presence of oil corresponds to a certain torque to be transmitted by the axially sliding gears and consequently to a slight axial force of the one with respect to the other, hence a slight additional tightening of the friction coupling device and consequently an increase of the rubbing forces and of the axial force, and so on up to the full engagement of the friction coupling device.

Although such slippage is desirable to produce progressive and smooth engagement of the clutch, the friction tends to heat up the disks to subject them to wear. According to another aspect of the invention, a coupling device in the form of an oil-lubricated multi-disk clutch comprises two rotating elements; a stack of axially slidable annular disks, each disk having two opposite friction faces and alternate ones of the disks being connected for rotation with one and the other of the rotary elements; means for selectively clamping the stack so that the stack of annular disks forms a peripheral wall of a chamber; and means for delivering oil to the chamber, wherein some of the disks have grooves on at least one of the two opposite friction faces, each groove extending outwardly from an inner edge to an outer edge of the respective friction face to define a passage for oil to flow from the chamber to the outer periphery of the stack of disks. This flow of oil lubricates the contacting friction faces during clutch slippage and also conducts heat generated by friction away from the disk stack.

The coupling means also can include a means for the selective engagement of a transmission torque ratio selected between two ratios, this engaging means being actuated by the resultant of the axial force tending to displace the two helical gears in relation to one another and an axial force generated by a means for providing an opposing force. The gear combination is differently activated to achieve either one of the two aforesaid ratios, such that, when there is a change of ratio, this resultant force varies in the direction stabilizing the change of ratio.

In this manner a hysteresis effect is achieved which is very desirable for the automatic control of a vehicle transmission. If for a given torque the shift to the higher ratio takes place at 4,000 rpm, the shift to the higher ratio makes the two helical gears work differently and diminishes or cancels their axial force such that the return to the lower ratio, under conditions otherwise similar, will take place only at an engine speed of, for example, 3,000 rpm. This is very desirable to avoid excessively frequent changes of ratio.

The means for providing an opposing force can be a speed sensitive means, such as a centrifugal means. Such means are capable of generating forces sufficient to actuate directly the selective coupling means. Thus, there is no need for any control circuit and hydraulic power circuit for controlling the transmission.

According to an advantageous version of the invention, the change to the higher ratio is performed by engaging a direct-drive clutch, which cancels the axial thrust of the axially displaceable helical gears. Downshifting will take place if the torque to be transmitted exceeds the capacity of the direct-drive clutch, which first begins to slip. The result is a partial reappearance of the axial thrust, which then intervenes to accelerate the return to the lower ratio and to the complete disengagement of the direct-drive clutch.

In one version of the invention, the gear combination is part of a multiple ratio mechanism functionally mounted between an intermediate transfer element and the output element, an input mechanism of at least two ratios being functionally mounted between the input element and the intermediate transfer element.

Thus, according to the ratio that is in service in the input mechanism, the torque transmitted to the multiple ratio mechanism is more or less great. If the input mechanism is working at its lower ratio, the torque transmitted to the multiple ratio mechanism is increased correspondingly with respect to the drive torque, and consequently the shifts to the higher ratios are delayed in the multiple ratio mechanism. A "sport" kind of operation is thus obtained, i.e., with "shorter" transmission ratios and higher engine speeds.

Preferably, the input mechanism is sensitive to the torque on the input element for the purpose of shifting automatically to a relatively low transmission ratio when the torque on the input element exceeds a high threshold and to a relatively high transmission ratio when the torque on the input element falls back below a low threshold.

Another aspect of the invention results from the fact that the axial thrusts engendered by the helical gears are inverted when the torque to be transmitted changes sense. It is therefore possible to arrange it such that the controls will be differentiated according to whether the engine is producing a drive torque or, on the contrary, a reverse torque (when the engine is decelerating).

For example, in the case of a cascade of three gears, such as a sun gear, a planet gear, and a ring gear in a planetary train, the axial reactions on the sun gear and on the ring are in directions opposite one another, while the planet gear, subjected to two equal and opposite reactions, is in equilibrium. For the transmission of a drive torque, it can be arranged so that one of the gears thrusts on the gear case so that the other will exert its axial reaction in the direction desired for the control of the transmission. When the torque to be transmitted is a resistive torque (e.g., engine braking) the axial forces are reversed and it can be arranged so that they cancel one another by providing means for mutual axial thrust between the sun gear and the ring gear.

Lastly, according to an advantageous version of the invention, the transmission device includes between the input element and the output element a succession of modules of two ratios, each sensitive to the speed of rotation of one of its elements to shift from the lower ratio to the higher ratio against the axial force of the two helical gears of each module.

Thus a simple design is obtained, as well as the possibility of increasing the number of ratios of the transmission by increasing the number of modules. If desired, the latter can be all strictly identical, even as regards the functional settings.

At the beginning of operation, all the modules operate at their low ratio, and the speed of each of them therefore decreases from the element adjacent to the input to the element adjacent to the output. The torque, on the other hand, increases from the input element to the output element. It is therefore the input element (low torque, high speed) that first shifts to its higher ratio. This reduces the torque in the following module, but does not modify its speed, which is determined by the speed of the output element and the transmission ratios in the following modules which have not been modified. Consequently, the drive speed must increase before the second module shifts in turn to its higher ratio, and so on.

Other features and advantages of the invention will appear in the description given below.

BRIEF DESCRIPTION OF THE DRAWINGS

In the appended drawings, given as non-limiting examples:

FIG. 1 is a cut-away perspective view of an epicyclic train of a known kind; FIGS. 1a and 1b are representations of certain forces involved in its operation;

FIGS. 2 and 3 are partial plan views of the teeth of the sun gear and of the ring, respectively, of the epicyclic train of FIG. 1;

FIG. 5 is a half-view in axial section of a two-ratio transmission according to a first embodiment of the invention;

FIGS. 6 and 7 are two half-views of the same transmission when it is operating at its high ratio and at its low ratio, respectively;

FIG. 8 is a half-view in axial section of another transmission according to a second embodiment of the invention;

FIGS. 9 to 12 are partial views in section of the centrifugal clutch of the transmission of FIG. 8, at four stages of operation;

FIG. 13 is a view similar to FIG. 8 showing, on the right side, the transmission operating in direct drive, and on the left side the transmission operating in its second ratio;

FIG. 14 is a detail of FIG. 8, showing certain thrust forces during operation in the first ratio;

FIG. 15 is a detail of FIG. 11 showing certain thrust forces during deceleration (engine braking) in the second ratio;

FIG. 17 is a detail of FIG. 16 at the end of the clutch engagement;

FIGS. 18 and 19 are axial half-views of respective fourth and fifth embodiments of the invention;

FIG. 20 is an exploded perspective view of a sixth embodiment of the invention;

FIGS. 21-24 are half views of the transmission of FIG. 20 in four different operational conditions, the housing of the transmission being shown in FIG. 2 only;

FIG. 25 is a sectional view of the reversing device of the embodiment of FIG. 20;

DESCRIPTION OF THE PREFERRED EMBODIMENTS

Figure 4:
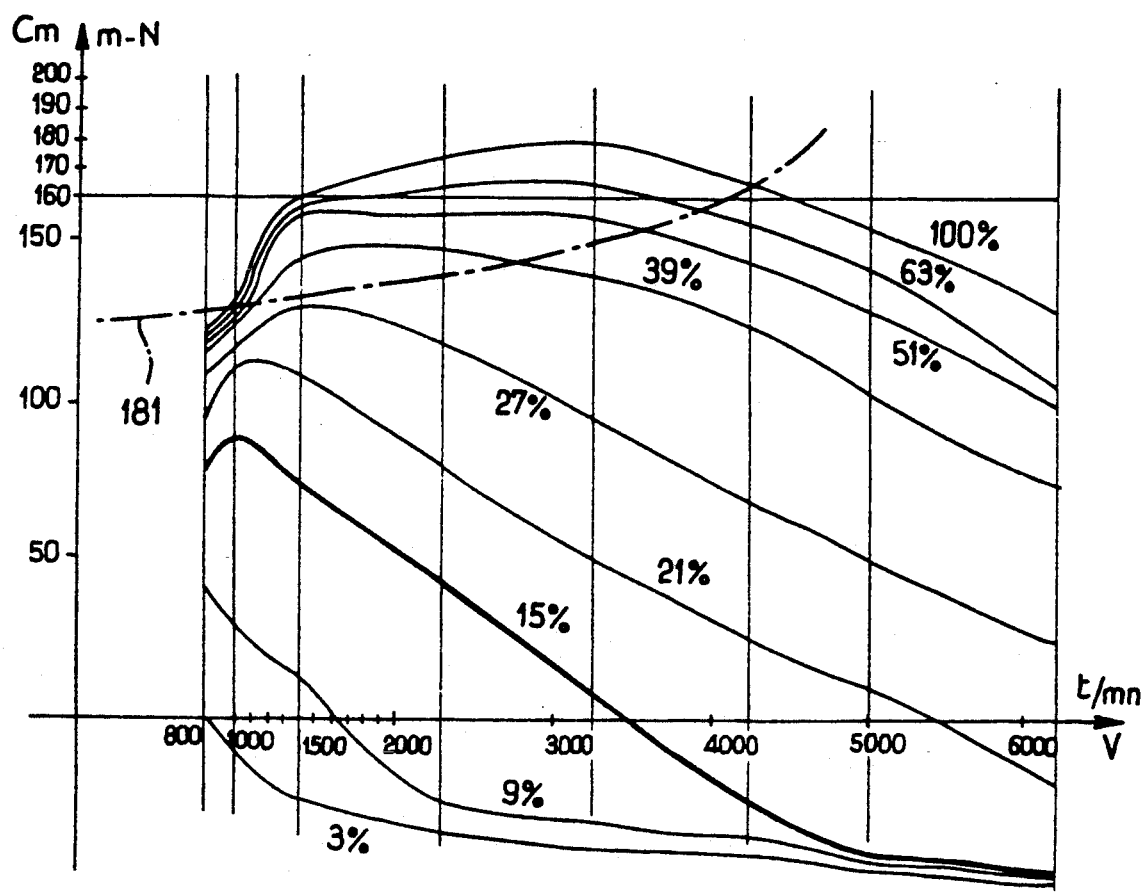
FIG. 4 is an example of a torque curve of an internal combustion engine in relation to the speed of rotation for different percentages of opening of the throttle valve.

As shown in FIG. 1, an epicyclic train normally has a sun gear 1 with external helical teeth, a ring gear 2 having internal helical teeth and a diameter greater than the outer teeth of the sun gear 1, and between the sun gear 1 and the ring gear 2, planet gears 3 which mesh with the sun gear 1 and the ring gear 2.

The planet gears are supported in rotation by a planet holder 4 which is represented only in fine lines. If it is assumed that the shaft 6 on which the sun gear 1 is fixed is, for example, the input shaft, the ring gear 2 can be locked, enabling the planet holder 4 to perform a rotational movement coaxial with the shaft 6, but slower than that of shaft 6. The epicyclic train then operates as a speed reducer with a relatively high reduction ratio. If, however, the sun gear 1 is locked, and the ring gear 2 is connected to the input and the planet holder 4 to the output, the gear train will again work as a speed reducer, but with a lower reduction ratio than in the preceding case. If, however, the ring gear 2 and the planet holder 4 are connected to one another, or the planet holder 4 to the shaft 6, or ring gear 2 to shaft 6, the entire epicyclic train will rotate as a single unit and constitute a direct-drive device. Also, the planet holder 4 can be locked, and in that case the shaft 6 and ring gear 2 will revolve inversely, so a reverse drive will thus be obtained, which will be a speed-reducing drive if the input is applied to shaft 6, and a speed-multiplying drive if the input is applied to ring gear 2.

For the speed-reducing or reverse modes of operation, the forces applied to the teeth of the sun gear 1 and of the ring 2 have been represented by the arrows $F_P$ and $F_C$ when for example the ring 2 is held and the sun gear 1 transmits a torque in the sense of the arrow G.

These forces $F_P$ and $F_C$ are exerted on the flanks of the teeth of the sun gear 1 and on those of the ring gear 2, respectively. Since these flanks are oblique with respect to the axis of the transmission due to the helical configuration of the teeth, the forces $F_P$ and $F_C$ are in fact directed obliquely (FIGS. 2 and 3) with respect to the axis of the transmission, that is, perpendicularly to the contact surface between teeth (disregarding the effect of friction). These contact forces $F_P$ and $F_C$ therefore have a circumferential component $F_{CP}$ and $F_{CC}$ used for the transmission of the torque, and an axial component $F_{AP}$ and $F_{AC}$ which will be utilized according to the invention.

As shown in FIG. 1, the teeth of the sun gear 1 are inclined in a direction contrary to the teeth of the ring gear 2 with respect to the axis of the transmission, so that the direction of the axial force $F_{AP}$ to which the sun gear 1 is subjected is contrary to that of the axial force $F_{AC}$ to which the ring gear 2 is subjected, as shown in FIG. 3. Consequently, in the example represented in FIG. 1, considering the sense G of the torque transmitted by the sun gear 1, the sun gear is urged axially toward the observer of FIG. 1, whereas the ring 2 is urged axially in the opposite direction. The planet gears 3, which undergo two opposite axial reactions at their points of mesh, are in equilibrium overall.

During direct-drive operation through a clutch coupling the input to the output of the planetary train, the connections through gears no longer transmit torque, and consequently the axial forces disappear. If, however, direct drive is obtained by coupling the ring gear and the planet holder while the input is made to the sun gear, axial forces continue to subsist on the sun gear and on the planet holder.

Now we shall comment, referring to FIG. 4, on the drive torque curves $C_m$ expressed in an example in m.N in relation to the speed of rotation of an engine expressed in rpm. It can be seen that when the engine is running at maximum load, the drive torque reaches a maximum value at an intermediate speed on the order of 3,000 rpm, after which the torque decreases up to 6,000 rpm.

Thus, the drive torque constitutes not only a measure of the output that is demanded from the engine by the driver, but also, at least after a certain speed of around 1,500 rpm, a measure of the rotary speed of the engine. In other words, if the drive torque is greater in the example than 160 m.N, the value referenced by a horizontal line, one knows that the driving speed cannot be greater than 4,500 rpm.

A description will now be given of various embodiments of the invention which make use of the above findings, in reference to FIGS. 5-25 wherein the axial play and axial movement are exaggerated to facilitate comprehension, the play and movement being actually difficult to perceive with the naked eye.

The device represented in FIG. 5 is a two-ratio transmission with automatic shift depending on the torque present on an input shaft 7, which is fixed to the ring gear 2 of a planetary train 5 as well as to the first element 8 of a multidisk oil-bath clutch. The planet holder 4 of the planetary train is affixed on the one hand to the other element 11 of the clutch 9, and on the other hand to the output shaft 12 of the transmission. The sun gear 1 of the planetary train is mounted so as to revolve freely around the output shaft 12 in the sense called "direct," that is, the normal sense of rotation of shafts 7 and 12. On the other hand, the rotation of sun gear 1 in the reverse sense is prevented by a free wheel 14 (such as an overrunning or sprag clutch) interposed between the sun gear 1 and a gear box 16 of the transmission which is only partially represented.

The sun gear 1, the ring gear 2 and the planet holder 4 are mounted so as to slide freely axially, each with respect to the other two. An axial thrust bearing 17 is placed between the sun gear 1 and the planet holder 4 to enable the sun gear 1 to thrust axially against the planet holder 4 in the direction for disengagement of the clutch 9. The helical teeth of the planetary train are orientated such that the axial reaction $F_{AP}$ which the sun gear 1 undergoes when it is relatively rotating with respect to the planet gears 3 will be directed so as to thrust the sun gear 1 axially against the planet holder 4 through the medium of the thrust bearing 17.

This axial thrust on the planet holder 4 is countered by a biased opposing means consisting of a compression spring 18 interposed between a wall 19 integral with the ring gear 2 and a pusher 21 mounted to slide axially with respect to the wall 19 and capable of thrusting against the planet holder 4 through the medium of an axial thrust bearing 22, so that the force of spring 18 is exerted on the planet holder 4 in a direction contrary to the axial reaction $F_{AP}$.

As shown in FIG. 6, when at rest, the force of spring 18 is not counterbalanced by any reaction of the sun gear 1, and consequently the pusher 21 pushes the planet holder 4 to its extreme leftward position with respect to the ring gear 2, and this causes the engagement of the clutch 9. Consequently, the thrust bearing 22 is under compression, but not thrust bearing 17. Upon start-up, if the torque to be transmitted does not exceed a certain threshold corresponding to the capacity of clutch 9 under the engaging force of spring 18, the clutch 9, which rigidly ties together the ring gear 2 and the planet holder 4, makes the planetary train operate in direct drive, i.e., the output shaft 12 rotates at the same speed as the input shaft 7. The torque transmitted produces no axial thrust on the sun gear 1, for it is transmitted not through gears but through the clutch 9 which, so to speak, shunts the gear connections.

If the torque present on shaft 7 exceeds the transmission capacity of the clutch 9, the latter starts to slip, and a certain relative rotation is produced between the gears of the epicyclic train. This relative rotation causes the appearance of an axial thrust $F_{AC}$ in the ring gear 2 (FIG. 7) and of a contrary axial thrust (not shown) in the planet gear 3, said contrary axial thrust being transmitted to the planet carrier 4. Both axial thrusts tend to disengage the clutch 9 against the action of spring 18, so that slippage in the clutch increases and so on, until the clutch 9 is completely disengaged. At a certain stage, slippage in the clutch 9 is such that sun gear 1 tends to rotate in the reverse direction, but this is prevented by the free-wheel 14. As from this moment, the axial thrust on the planet gear 3 is balanced, and the situation is then as shown in FIG. 7. When the sun gear 1 is immobilized by the free wheel 14, the planet holder 4, and with it the output shaft 12, revolves in the direct sense, at a rotary speed lower than that of the input shaft 7. If the free wheel were not provided, the load to be driven would immobilize the shaft 12, and the sun gear 1 would revolve uselessly in reverse.

If the torque present at the input shaft 7 decreases again to the point that the axial thrust $F_{AP}$ becomes lower than the force of the spring 18, the latter produces a return to the situation of FIG. 6. The torque threshold at which this takes place preferably is a low threshold that is less than a high threshold at which the clutch 9 begins to slip. The high threshold is defined by the transmission capacity of the clutch under the force of the springs 18; the low threshold is defined by the inclination of the gear teeth with respect to the axis, and still with respect to the force of the springs 18. Each threshold can thus be selected independently from the other during design of the transmission. When the spring 18 calls for a return to direct drive, the clutch 9 engages fully without excessive slip, because the torque to be transmitted is lower than the low threshold, and thus is much lower than the high threshold corresponding to the transmission capacity of the clutch.

In practice, in reference to FIG. 4, if it is assumed that the spring 18 is biased so that the clutch 9 will slip above 160 m.N, it can be seen that, for an engine speed greater than 1,400 rpm and less than 4,500 rpm, if the driver abruptly makes the engine deliver its full power, for example to pass a vehicle or climb a hill, the torque furnished by the engine is going to exceed the high threshold of 160 m.N, and the transmission will adopt its operation as a speed reducer, increasing the torque delivered to the wheels of the vehicle in relation to the torque put out by the engine. The engine speed will increase and perhaps enter the zone in which the drive torque is lower than the high threshold without, however, becoming less than the low threshold. As soon as the driver lets up on the accelerator pedal, the torque on shaft 7 greatly diminishes and the spring 18 makes the transmission go back to direct drive.

Since it is known at what maximum speed (4500 rpm in the example) the torque can no longer reach or pass the threshold of 160 m.N, it is certain that the automatic change-over to speed reducing operation depending upon the torque at the input shaft 7 cannot result in overspeeding of the engine, provided only that the reduction ratio introduced by the transmission is lower than the ratio between the maximum speed of the engine and the speed at which the high threshold is available. For example, if the high threshold is available up to 4,500 rpm and the maximum engine speed is 6,000 rpm, it is necessary that the reduction ratio in the mechanism be no more than about 1.3, since $6,000/4,500 = 1.33$.

During operation with engine braking, the transmission operates in direct drive, since the reverse torque that is transmitted reverses the direction of the reaction on the sun gear 1 and the ring gear 2 so that the spring 18 holds the clutch 9 engaged.

In the embodiment of FIG. 8, the input shaft 7 rotates together with the receiving plate 23 of a centrifugal clutch 24 which includes a drive plate 26. As also seen in FIGS. 9 to 12, a cylindrical bracket 27 is secured to the drive plate 26. Each of a plurality of spring leaves 28 is anchored at one of its extremities to the cylindrical bracket at points distributed on the circumference of the clutch. The other extremity of each spring leaf 28 is affixed to a skid 29 having a shoe 31 and a friction lining 32.

The receiving plate 23 itself bears a cylindrical bracket 33 of a diameter decidedly smaller than the bracket 27 of the drive plate 26. Likewise, each of a plurality of spring leaves 34 affixed at one of its extremities to the bracket 33 carries at its other end a skid 36 having a shoe 37 and a friction lining 38 situated opposite a ring 39 which surrounds them and which is affixed against the radially inner wall of the bracket 27.

As can be seen in FIG. 9, when neither of the two plates 23 and 26 is at a speed exceeding a certain low threshold, equal for example to 1,200 rpm, the spring leaves 28 and 34 hold the skids 29 and 36, respectively, away from an inner cylindrical surface 41 of the receiving plate and from the inner cylindrical surface of the ring 39, respectively.

If, beginning from this situation, the speed of the drive plate increases, the leaves 28 and skids 29 develop in themselves a centrifugal force which exceeds the flexural return force provided by the leaves 28, so that the skids 29 rub against the wall 41 in the sense producing a buttressing force on the leaves 28.

This gradually sets plate 23 in rotation in the same sense as the drive plate 26. The bracket 33 is therefore made to rotate in turn, the same as the leaves 34 and skids 36 which, when a certain speed is reached by the receiving plate 23, come to rub against the ring 39, thereby increasing the frictional engagement between the two plates.

The purpose of the bracket 33 connected to the receiving plate 23 and of the skids 36 in combination with the ring 39 is to avoid the well-known disadvantage of centrifugal clutches, which is that they do not permit re-engagement if the engine is stopped when the clutch was in the disengaged state. This is dangerous when the vehicle is running down a hill. As shown in FIG. 12, with the clutch in accordance with the invention, the bracket 33 and the skids 36 are in such a case driven in rotation, and the skids 36 come into frictional engagement with the ring 39, which therefore will set the engine plate 26 in movement and consequently restart the engine of the vehicle. Once this result is achieved or about to be achieved, the skids 29 will in turn make contact with the wall 41, and the situation of FIG. 11 will again be reached.

In the embodiment of FIG. 8, the input shaft 7 is engaged through axially sliding splines with the sun gear 51 of a first epicyclic or planetary train 49 having a planet holder 54 which can be connected to the output shaft 62 through the medium of a reverse-gear system 63.

The reverse-gear system 63 is essentially comprised of an epicyclic train of which the ring gear 66 is integral with the planet holder 54, the sun gear 67 is integral with the output shaft 62, and the planet holder 68 can, by means of a manually operated dog coupling slider 69, be engaged at 71 with the planet holder 54 of the gear train 49 to achieve a direct drive between the planet holder 54 and the output shaft 62, as represented in FIG. 8. Alternatively, it can be engaged at 72 with the housing 16 so as to prevent the planet holder 68 from revolving, to achieve a reversal of the sense of movement between the planet holder 54 of gear train 49 and the output shaft 62, which then causes the vehicle to run in reverse.

The planet holder 54, the sun gear 51 and the ring 52 are mounted so as to be free to slide axially, each with respect to the other two.

The ring gear 52 of the epicyclic gear train 49 is integral with the first element 58 of a clutch 59 whose other element 61 is integral with the planet holder 54. A free wheel 64 is functionally interposed between the ring gear 52 and the housing 16 to prevent the ring 52 from revolving in the reverse sense when it is released by the clutch 59.

The clutch 59 is of the multiple disk type and is controlled by weights 73 articulated about a virtual axis 74 with respect to the planet holder 54 so as to be able to pivot radially outwardly around the axis 74, whereas a lobe 76 on these weights, through the medium of a pusher 77, squeezes the disks of the clutch 59. Conveniently, the weights 73 are made of all-identical stampings from sheet metal (only one of them is represented in FIG. 8), held in axial planes of the mechanism in corresponding slots 78 in the clutch element 61. Each weight 73 is extended in the direction of the shaft of the mechanism by a foot 81 which rests against a ring 82 revolving with the planet holder 54, while being thrust axially against the housing 16 through an axial thrust bearing 83. Taking into account the ring 82, the weights can pivot radially inwardly only if the planet holder of gear train 49 shifts axially leftward in FIG. 8, as represented in FIG. 13. However, as shown in FIG. 14, such a displacement is opposed by the axial reaction $F_{AP}$ of the sun gear 51 when the latter transmits a torque to the planet gears 53 of gear train 49, this axial reaction being transmitted to the planet holder 54 through the medium of an axial thrust bearing 57. In this case the axial reaction in the contrary sense $F_{AC}$ which the ring gear 52 undergoes is taken up by the shaft 7 through an axial thrust bearing 84 and a stop ring 86.

The shaft 7 is itself abutted through another stop ring 87 against a disk 88 which is in splined engagement with the shaft 7 and which carries close to its periphery the weights 89 articulated with respect to it about an axis 91, so that they can separately move radially away from the axis of the mechanism, while a lobe 92 on each weight thrusts against the axially held receiving plate 23. This produces a thrust against the disk 88, transmitted to the shaft 7, in a sense contrary to the reaction $F_{AC}$ of the ring gear 52. A free wheel 93 interposed between the ring gear 52 and the sun gear 51 obliges the sun gear 51 to revolve at least as fast as the ring gear 52; thus, when the engine braking is in effect, the planetary train 49 operates such that the speed of shaft 7 will be at least equal to that of the output shaft 62.

The gear box contains a second planetary train 94 comprising a sun gear 101 driven in rotation by the shaft 7 by means of splines with the possibility of axial sliding, a planet holder 104 which is connected to the ring gear 52 of gear train 49 through the medium of a free wheel 96 which keeps it from revolving faster than ring gear 52, and a ring gear 102 which is selectively connected to the housing 16 through the medium of a multiple disk clutch 109. All three elements 101, 102, 104, are mounted so that each is able to slide axially with respect to the other two. The inclination of the helical teeth of second train 94 is contrary to that of first train 49, so that, as shown in FIG. 13, the axial thrust of ring gear 102 will be directed towards the right side of the figure, in a sense corresponding to the engagement of the clutch 109. The axial thrust of the sun gear 101 is therefore directed leftward in the figure, and it is transmitted to the housing 16 through the medium of the planet holder 104 and the two axial thrust bearings 97 and 98. In other words, the sun gear 101 and the ring gear 102 operate like a clamp grasping between its jaws the clutch 109, part of housing 16, the axial thrust bearing 98, part of the planet holder 104, and the axial thrust bearing 97. The presence of the planet holder 104 in this "sandwich" has the sole purpose of permitting the planet holder 104 to extend up to the free wheel 96.

The shaft 7 furthermore carries a collar 111 which thrusts against the ring gear 102 through the medium of an axial thrust bearing 112 in the direction tending to engage the clutch 109, that is, the same direction as the axial thrust of ring gear 102. The sun gear can thrust in the same direction against the stop ring gear 86 of shaft 7.

The operation of the gear box is as follows:

Upon starting, the situation is substantially as represented in FIG. 8, that is, all the clutches are disengaged.

As the engine speed increases above idling, first the centrifugal clutch 24 closes, so that the input shaft 7 and sun gear 51 are driven and the ring gear 52 tends to rotate backwards since the load to be driven, transmitted to the planet holder 54, tends to hold the latter. Since the ring gear 52 is prevented from rotating backwards by the free wheel 64 it remains immobile, held by the free wheel 64, and the planet holder 54 starts to turn at a reduced speed, a speed four times less, for example, than that of the shaft 7. The shaft 62 is therefore itself driven at this speed since the dog engagement 71 makes the reverse device operate as a direct drive.

During this time the sun gear 101, likewise driven by shaft 7, causes the rapid rotation, backwards, of the ring gear 102, through the medium of the planet gears of the planetary train 94 whose planet holder 104 is stopped, since the free wheel 96 prevents it from rotating faster than the ring gear 52 which itself is stopped. No force is transmitted by the second planetary train 94 and consequently no significant axial reaction is produced.

In the first planetary train 49, the axial reaction $F_{AP}$ of the sun gear 51 (FIG. 14) thrusts the planet holder 54 sufficiently strongly to the right to prevent the weights 73 from spreading out radially, on account of the still very low speed of the planet holder 54. Clutch 59 therefore remains in the disengaged state.

For the moment, the reaction $F_{AC}$ of the ring gear 52, transmitted to the shaft 7, balances the contrary thrust of the disk 88 which is in proportion to the speed of rotation of shaft 7. When this speed of rotation reaches a sufficient level, the corresponding thrust on the shaft 7 exceeds the thrust $F_{AC}$, and shaft 7 slides to the right so that, as represented in the left part of FIG. 13, the collar 111 pushes the ring gear 102, through the medium of the thrust bearing 112, into the engaged position of the clutch 109. As soon as engagement begins, an increasing axial reaction appears in ring gear 102 and results in an increasing tightening of the clutch 109, and so on, until the clutch is fully engaged. At this stage the clutch 59 is still disengaged, as represented on the right side of FIG. 8.

As a result of the engagement of clutch 109, the planet holder 104, and with it the ring gear 52 of the first train 49, is driven at a rotary speed that is less than that of shaft 7. In other words, the engagement of clutch 109 makes the second train 94 operate as a speed reducer between the shaft 7 and the ring gear 52 of the first train 49. The planet holder 54 of train 49 then has a speed of rotation which is between that of shaft 7 and that of ring gear 52. This corresponds to a second transmission ratio permitted by this gear box.

The speed of the output shaft 62 thus continues to increase until the centrifugal force of the weights 73 becomes sufficient to enable the latter to pivot as represented on the right side of FIG. 13, thrusting the planet holder 54 axially to the left and, with it the sun gear 51 of gear train 49. This causes clutch 59 to engage, so that the planetary train 49 runs in direct drive; i.e., there is a direct drive between the input shaft 7 and the output shaft 62, through the medium of the sun gear 51, planet holder 54, and the selective reverse device 63. The ring gear 52 then begins to rotate faster than the planet holder 104 of the train 94, but this is permitted by the free wheel 96.

Starting from the direct-drive situation represented in FIG. 13, if the driver depresses the accelerator pedal, the clutch 59 can, depending on the centrifugal force created by the weights 73, start to slip to gradually permit the return to the second transmission ratio, by which the torque available on the output shaft 62 is increased.

When decelerating with engine braking, as explained above, the gear box spontaneously operates in direct drive. It is possible by means of a manual device, however, to block the free wheel 96 and thus cause the planet holder 104 to rotate at the same speed as the ring gear 52. Since the ring gear is blocked, the sun gear 101 and consequently the shaft 7 rotate at a speed greater than that of the output shaft, with resulting friction, and hence additional mechanical braking, in at least one of clutches 59 and 109.

In this situation, as represented in FIG. 15, the reactions in the ring gear 102 and the sun gear 101 are reversed and cancel one another, since they are both carried back in contrary senses on shaft 7 through the collar 111 and the stop ring 86, respectively.

Figure 16:
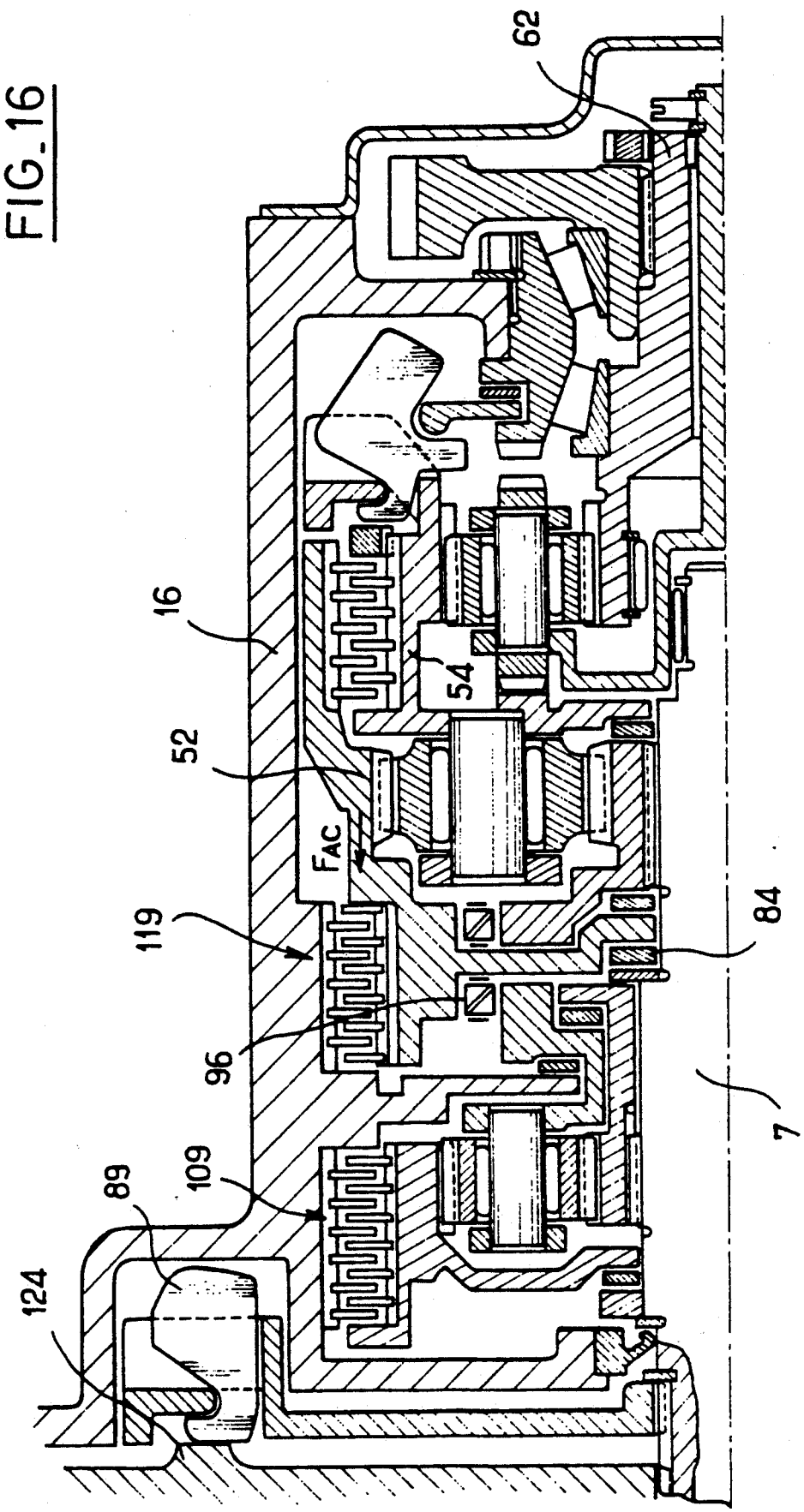
FIG. 16 is a view similar to FIG. 8, but relating to a third embodiment of the invention.

The embodiment of FIG. 16 will be described only as regards differences from the embodiment of FIG. 8. The centrifugal clutch 24 has been completely eliminated, as well as the free wheel 64 previously interposed between the ring gear 52 and the housing 16. Instead, a multiple disk clutch 119 is interposed between the ring gear 52 and the housing 16 such that the multiple disks of this clutch will be clamped against one another and against the housing 16 by the ring gear 52 when the latter undergoes its reaction $F_{AC}$ directed leftward.

The operation of this gear box is as follows:

When the engine, and consequently the shaft 7, driven by the engine flywheel 124, is rotating at the idling speed, the load attached to the output shaft 62 stops the planet holder 54 so that the ring gear 52 rotates backward at reduced speed. This backward rotation is no longer prevented by the free wheel 64, which has been eliminated. This produces a light friction in the clutch 119 which runs in oil and hence with viscous contact between its successive disks. This friction results in a slight negative torque which can create a slight force $F_{AC}$ on the ring gear 52. For safety, this slight force can be compensated by a small spring, not shown, exerting a contrary axial thrust.

If the driver increases the speed of shaft 7, the friction in clutch 119 increases, the reaction $F_{AC}$ likewise increases, the ring gear 52 shifts in the direction tightening the clutch 119, which further increases the axial reaction, and so on, until the progressive engagement of the clutch is completed. This stops the backward rotation of ring gear 52 and therefore causes rotation of the planet holder 54 and the output shaft 62 in the direct sense, resulting in a transmission ratio of about 1 to 4 between the input 7 and the output 62. To permit this process to take place without risk, a spring can be installed to hold the weights 89 back, so that they will not be able to thrust shaft 7 to the right until the engine speed increases to about 2500 rpm.

The sequence of operation in driving forward takes place as described in connection with FIGS. 8 to 15, except that the shifting of the shaft 7 to engage the clutch 109 also produces the disengagement of clutch 119 through the medium of the thrust bearing 84 pushing back the ring gear 52.

When decelerating with engine braking, however, the axial forces, particularly of the ring gear 52, are inverted, which causes clutch 119 to disengage. This is no problem since the movement coming from the output shaft 62 is transmitted by the ring gear 52 to shaft 7 through the free wheel 96.

The situation when the clutch 119 is engaged is represented in FIG. 17. When the clutch 59 is itself engaged, the sun gear 51 is, as represented, pushed back by the planet holder 54 (not visible in this figure) so as to push axially against the ring gear 52 through an axial thrust bearing 60. This intensifies the engaging force on the clutch 119.

When decelerating with engine braking, any reactions in the sun gear 51 and ring gear 52 are inverse with respect to the situation wherein the torque on shaft 7 is a driving torque, and they balance one another since they are transmitted on the two opposite faces of the axial thrust bearing 60.

In the embodiment of FIG. 18, an input mechanism 133 of the type described with reference to FIG. 5 has been interposed in a gear box according to FIG. 8, between a new partition 132 of the housing 16 and the sealed wall 131 which separates disk 88 and the centrifugal clutch 24 on the one hand, and the other parts of the gear box running in oil on the other. The partition 132 corresponds to the part of housing 16 which was visible in FIG. 5. The portion of the gear box of FIG. 18 which corresponds to the one in FIG. 8 will be called "multiple ratio mechanism 136" hereinafter.

In the system of FIG. 18, the output shaft 12 of the mechanism of FIG. 5 becomes an intermediate shaft 12 which extends toward the planetary trains 49 and 94, passes through them, and connects to them in exactly the same way as shaft 7 did in the embodiment of FIG. 8.

The input shaft 7 of FIG. 18 can rotate with respect to the intermediate shaft 12, as is necessary when the input mechanism 133 is working as a speed reducer. However, an axial thrust bearing 134 is placed between shafts 7 and 12 so that shaft 7 can thrust shaft 12 toward the interior of the multiple ratio mechanism 136 under the action of the weights 89 and shaft 12 can thrust shaft 7 toward the centrifugal clutch 24 against the effect of weights 89, as described in connection with FIG. 8.

When the input mechanism 133 is running in direct drive due to the torque present on shaft 7, as has been described with reference to FIGS. 5 to 7, the multiple ratio mechanism 136 itself operates as described in connection with FIGS. 8 to 15.

If, however, again as described with reference to FIGS. 5 to 7, the input mechanism 133 works as a speed reducer, the multiple ratio mechanism 136 still operates as described in conjunction with FIGS. 8 to 15, with three exceptions:

since the torque present on shaft 12 is increased, the shift from first to second requires a greater force on the part of the weights 89, and it will therefore be performed at a higher engine speed;

for the same reason, the shift from second to third will require a greater force on the part of weights 73, and consequently it will be performed at a higher speed of the output shaft 62;

once this shift from second to third is performed, the engine speed will increase until the driving torque decreases sufficiently for the loaded spring 18 to cause the shift of the input mechanism 133 to direct drive, which then constitutes a fourth transmission ratio.

An automatic transmission for vehicles has thus been achieved, which operates either with three ratios and relatively low engine speeds in normal driving, or in sport driving with four ratios, of which the first three are different from the first two of normal driving, causing the engine to run at speeds close to maximum power, which optimizes performance.

In the embodiment shown in FIG. 19, the transmission device is constituted by a centrifugal clutch 24 like the one in FIG. 8, followed by an axial lineup of a module 140 and, for example, two modules 180. The input shaft 7 in the module 140, which is closest to the clutch 24, constitutes the input shaft for the entire transmission device. A transfer shaft 12a constitutes the output shaft of this mechanism and also the input shaft for the following module 180, whereas a transfer shaft 12b constitutes the output shaft of the first module 180 and the input shaft for the second module 180 whose output shaft 62 is the output shaft of the entire transmission. If desired, reverse gear means, not shown, can be provided between shaft 62 and the output of the entire transmission.

Each successive module comprises a planetary train 139 of which, as in FIG. 5, the sun gear 141 rotates free)y on the respective output shaft 12a, 12b and 62, and is prevented from rotating backward with respect to housing 156 by a free wheel 154. Also in each successive module, the ring gear 142 is connected to the respective input shaft 7 and 12a and 12b, as well as to the first element 148 of a multiple disk clutch 149 whose other element 151 is connected with the planet holder 144, which itself is connected with the respective output shaft 12a, 12b, and 62. The sun gear 141, the ring gear 142 and the planet holder 144 are mounted so as to be able to slide axially, each with respect to the other two.

Each successive input shaft 7, 12a, 12b, is splined to a disk 168 pivotally supporting the weights 169 which can move radially away from the axis of the mechanism about a pivot 171 such that their lobes 172 axially push against the ring gear 142 and with it respective shaft 7, 12a, 12b in the direction for tightening the clutch 149 against the axial force $F_{AC}$ of the said ring gear 142, which therefore tends to disengage clutch 149. The axial thrust $F_{AP}$ of the sun gear 141, in the contrary direction, is taken up by the housing 156 through an axial thrust bearing 162. An axial thrust bearing 157 is inserted between the planet holder 144 and the sun gear 141 to permit a mutual axial thrust between them tending to engage clutch 149 during deceleration with engine braking.

The two modules 180 can be (strictly) identical, even as to their functional settings. Furthermore, it is possible to line up axially in this manner more than two modular mechanisms 180 to increase the number of ratios in the transmission.

Module 140 differs from the two modules 180 in that the weights 169 are much less numerous—for example, only 3 or 4 weights instead of 30 or 40. Between the weights of module 140 are compression springs 158 which axially thrust the ring gear 142 in the direction of engaging the clutch 149 with respect to the planet holder 144 thrusting against the housing 156 through the axial thrust bearing 162. Module 140 will act as an input mechanism like mechanism 133 of FIG. 18, and the modules 180 together form a multiple-ratio mechanism.

Operation is as follows: first, clutch 149 of module 140 is engaged by the springs 158, and the clutches 149 of the modules 180 are disengaged, so that both of the modules 180 work as speed reducers. The first module 180 is the one in which the rotary speed is the highest and the torque transmitted is the lowest. It is therefore this module which first attains the conditions in which its weights 169 come to engage clutch 149 so that this module shifts into direct drive, placing the transmission in a second ratio. This reduces the torque transmitted to the next module 180, but not its rotary speed, which is determined by the speed of the output 62. Therefore, this speed must increase, assuming the torque to be constant, before the weights of the next module 180 will shift it also into direct drive, so that the transmission will operate in a third ratio, which is the direct-drive ratio.

If the torque on the input shaft 7 exceeds the threshold defined conjointly by the springs 158 and the few weights 169 of module 140, the latter will start to operate as a reducer and then there will be four relatively "short" ratios for sports use instead of three relatively long ratios in quiet driving. The role of the weights 169 of module 140 is to increase the torque threshold at which the module 140 will "shift down" when the engine speed of rotation increases. This threshold is indicated by the chain-dotted line 181 in FIG. 4.

The embodiment shown in FIGS. 20-25 will be described only as to its differences with respect to the embodiment of FIG. 8. The similar elements are given the same reference numerals.

FIG. 20 shows a transmission 201 connected to the crankshaft of an internal combustion engine 202. The transmission has an input centrifugal clutch 24 with a driving disk 26 that also constitutes the flywheel of the engine, with gear teeth 203 provided for engagement by a starter.

The output shaft 62 of the transmission 201 is connected by way of a pair of pinions 204 to a selective reverse device 206, allowing selective reversal of the direction of rotation of an output shaft 207 with respect to the rotational direction of an input shaft 208. The rotation of the output shaft 207 is transmitted to a cage 209 of a conventional differential device 211 having bevel gears 212 connected to each of two drive wheels 213 of a vehicle.

As shown in FIG. 21, a receiving disk 23 of the centrifugal clutch 24 has two opposite faces provided with friction linings. The receiving disk 23 can be clamped between the driving disk 26 and a pressure plate 214 against a disengaging force exerted by compression springs 242. Cylindrical rollers 219 are disposed for rolling in a radial direction on a face 215 of the pressure plate which is remote from disk 23. Each end of an axle 216 of each roller 219 rolls on a respective track 220 mounted on an inner face of a conical bell 218 which is fixed to the driving disk 26. The distance between the tracks 220 and the face 215 of the pressure plate decreases with increasing radial distance from the main axis 217 of the transmission. As engine speed increases, centrifugal force exerted on the rollers as the clutch 24 rotates tends to move the rollers radially outward between the conical bell 218 and the pressure plate, thereby pressing the plate against the receiving disk 23, and the receiving disk in turn against the driving disk against the counter force of the compression springs 242. This produces frictional clutching between the driving disk 26 and the shaft 7, as shown in the lower half of FIG. 22.

The shaft 7 is fixed to a sun gear 51 of a first epicyclic or planetary train 49 on the one hand and with a pressure plate 221 of a second centrifugal clutch 109 on the other hand. The sun gear 51 has helical teeth inclined in a direction so as to generate an axial thrust $F_{AP}$ (FIG. 22) that is directed towards the left of the figure, thereby urging the pressure plate 221 also to the left and tending to disengage clutch 109.

The construction of centrifugal clutch 109 is similar to that of the input clutch 24. Clutch 109 has a bell 222 that is mounted, however, for free rotation on shaft 7 and that faces in the opposite direction from the bell 218 of clutch 24 and abuts against bell 218 through an axial thrust bearing 223. Bearing 223 is subjected to the axial force component generated on the bell 222 by the radially outward movement of rollers 224 with increasing engine speed. When the centrifugal force exerted on the rollers 224 is strong enough, the rollers move outwardly on the tracks 226 and thereby urge the pressure plate 221 axially against the counter force of the compression springs 244 and against the axial thrust $F_{AP}$, as shown in FIG. 23. In this figure, the solid black arrows indicate the direction of axial thrusts due to the helical gear teeth, and the cross-hatched arrows indicate the direction of axial thrusts due to centrifugal forces.

The clutch 109 has a receiving disk 227 that is clamped between the pressure plate 221 and a counter-bearing disk 228 when the clutch 109 is in the tightened (engaged) condition. Disk 228 is fixed to the bell 222. The receiving disk 227 is connected for rotation with a sun gear 101 of a second epicyclic train 94 that has a ring gear 102. A planet holder 104 of the second train 94 is fixed to a ring gear 52 of the first epicyclic train 49. A free wheel 229 prevents the ring gear 102 of the second train 94 from rotating in the reverse direction. A combination radial and thrust bearing 246 rotatably supports the receiving disk 227 of the second centrifugal clutch and the sun gear 101 of the second epicyclic train 94 in the housing 16 while preventing their axial movement.

Epicyclic train 49 has a planet holder 54 that is fixed to an output shaft 62 and carries centrifugal weights 73. These weights exert an axial force on ring gear 52 through an axial thrust bearing 231 and a resilient means such as a Belleville washer 243 in a direction tending to engage a clutch 59 when pivoting radially outward (as shown in FIG. 24) due to centrifugal force caused by rotation of the output shaft 62. A counter axial thrust $F_{AC}$ generated by the helical teeth of the ring gear 52 when the latter transmits a torque in the normal direction from shaft 7 toward the output shaft 62 tends to disengage the clutch 59.

As shown in FIG. 20, the selective reverse device 206 is located separate from the transmission housing 16 instead of inside the housing, as in the embodiment of FIG. 8. FIG. 25 shows the details of this device. It comprises a differential mechanism having two opposed sun gears 232 and 233 which are respectively connected to an input shaft 208 and to an output shaft 207 of the device. A cage 234 of the differential mechanism rotatably supports two planet gears 236, each of which meshes with both sun gears 232 and 233. The cage 234 is fixed to an externally splined ring 237 on which an internally splined dog clutch slider 238 is slidably engaged. The dog clutch slider 238 is connected to a manual control (not shown) for selective movement towards the right of the figure for engaging a mating externally splined ring 239 which is fixed to the input shaft 208 to operate the mechanism in direct drive or, on the contrary, for movement towards the left of the figure for engaging a mating stationary splined flange 241. In the latter case, the cage 234 is held stationary, and the planet gears 236 function as rotation inverters between the input sun gear 232 and the output sun gear 233.

The operation of the embodiment of FIGS. 20-25 will now be explained.

FIG. 21 shows the condition of the transmission when the engine is stopped or idling. The centrifugal force exerted on the rollers 219 of the first clutch 24 is not strong enough to overcome the biasing thrust of compression springs 242, so the clutch 24 is disengaged and shaft 7 is stationary, if the vehicle is not moving. In this situation, the pivot weights 73 do not exert any axial thrust due to centrifugal movement because the output shaft 62 is stationary, but the Belleville washer 243 maintains engagement of the clutch 69. By contrast, the second centrifugal clutch 109 is maintained disengaged by the biasing thrust of its compression springs 244, since the stationary condition of shaft 7 creates no centrifugal force on the rollers 224.

If the engine accelerates above idling speed, the rotational speed of the disk 26 increases, the rollers 219 move radially outward to tighten the clutch 24 against the thrust of the biasing springs 242, and shaft 7 starts to rotate. The torque transmitted to the sun gear 51 tends to rotate the ring gear 52 in reverse, but movement is prevented by the free wheel 64. This generates in the ring gear 52 an axial thrust $F_{AC}$ which tends to flatten the Belleville washer 243 and disengage the clutch 59. As a consequence, the ring gear 52 is uncoupled from the planet holder 54 while being held stationary by the free wheel 64. Thus engine rotation is transmitted with a large speed reduction ratio and a corresponding strong torque multiplication factor (for example, in a ratio equal to 4) from the driving disk 26 to the output shaft 62.

The energy flow path through the transmission is traced by the double-line arrow in FIG. 22. The sun gear 51 produces an axial thrust $F_{AP}$, which opposes the thrust $F_{AC}$ of the ring gear 52. The thrust $F_{AP}$ urges the pressure plate 221 in the direction of disengaging the clutch 109, against the action of the rollers 224 which are subjected to centrifugal force due to the rotation of shaft 7. Since the clutch 109 is disengaged and the planet holder 104 is stationary, the sun gear 101 of the second epicyclic train 94 is also stationary.

When the speed of rotation of the shaft 7 increases relative to the torque being transmitted to the point where the centrifugal force exerted on the rollers 224 overcomes the axial thrust $F_{AP}$ generated by the helical teeth of the sun gear 51, the second clutch 109 is then tightened. Consequently, the sun gear 101 of the second train 94 rotates at the same speed as shaft 7. Since the ring gear 102 of the second train is prevented from rotating in the reverse direction by the free wheel 229, the rotation of the sun gear 101 produces rotation of the planet holder 104 of the second train and of the ring gear 52 of the first train in the normal direction at a reduced speed. This establishes a new speed reduction ratio between the shaft 7 and the output shaft driving the vehicle wheels. This second ratio, for example equal to 1.9, corresponds to a lower speed reduction and less torque multiplication between shaft 7 and output shaft 62.

The second epicyclic gear train 94 may have helical gear teeth for quiet operation, but the axial thrust which would then be generated in the sun gear 101 during operation in the second speed reduction ratio will be resisted by the radial thrust bearing 246 to prevent axial movement of the sun gear 101. A spline connection 247 between the sun gear 101 and the disk 227 of the clutch 109 allows the disk 227 to move axially with respect to the sun gear 101.

As shown in FIG. 24, when the shaft 62 reaches a certain speed of rotation, which varies as a function of the torque being transmitted, the weights 73 succeed in pivoting radially outward against the counter force of the axial thrust $F_{AC}$. While pivoting outward, the weights 73 tighten engagement of the clutch 59, shifting the first epicyclic train 49 into direct drive. The ring gear 52 then rotates in the forward direction at the same speed as the planet holder 54 and as the shaft 7, and thus at the same speed as the sun gear 101. The ring gear 102 is also obliged to rotate at the same speed, so the entire assembly rotates as a unit, and the transmission ratio is then equal to 1.

During deceleration with engine braking, the direction of the transmitted torque is reversed. In this situation, which is not illustrated in the drawings, the thrust $F_{AC}$ acting on the ring gear 52 is directed toward the left of FIGS. 21-24 and tightens the clutch 59 with the help of the Belleville washer 243. The shaft 7 thus rotates at least as fast as the shaft 62. If a free wheel 248 is installed between shaft 7 and the disk 26 to keep the shaft 7 from rotating faster than the disk 26, the rotational speed of the engine cannot be less than that of shaft 62.

It is possible to provide a means 249 (FIG. 21) for applying a predetermined braking to the ring gear 102 to downshift the transmission to the second ratio when the force of the weights 73 decreases and allows clutch 59 to slip. This introduces supplemental frictional braking in the clutches 59 and 109, which is desired when the transmission operates to retard the vehicle speed. The brake 249 can be actuated, for example, in response to actuation of the vehicle brakes.

Figure 26:
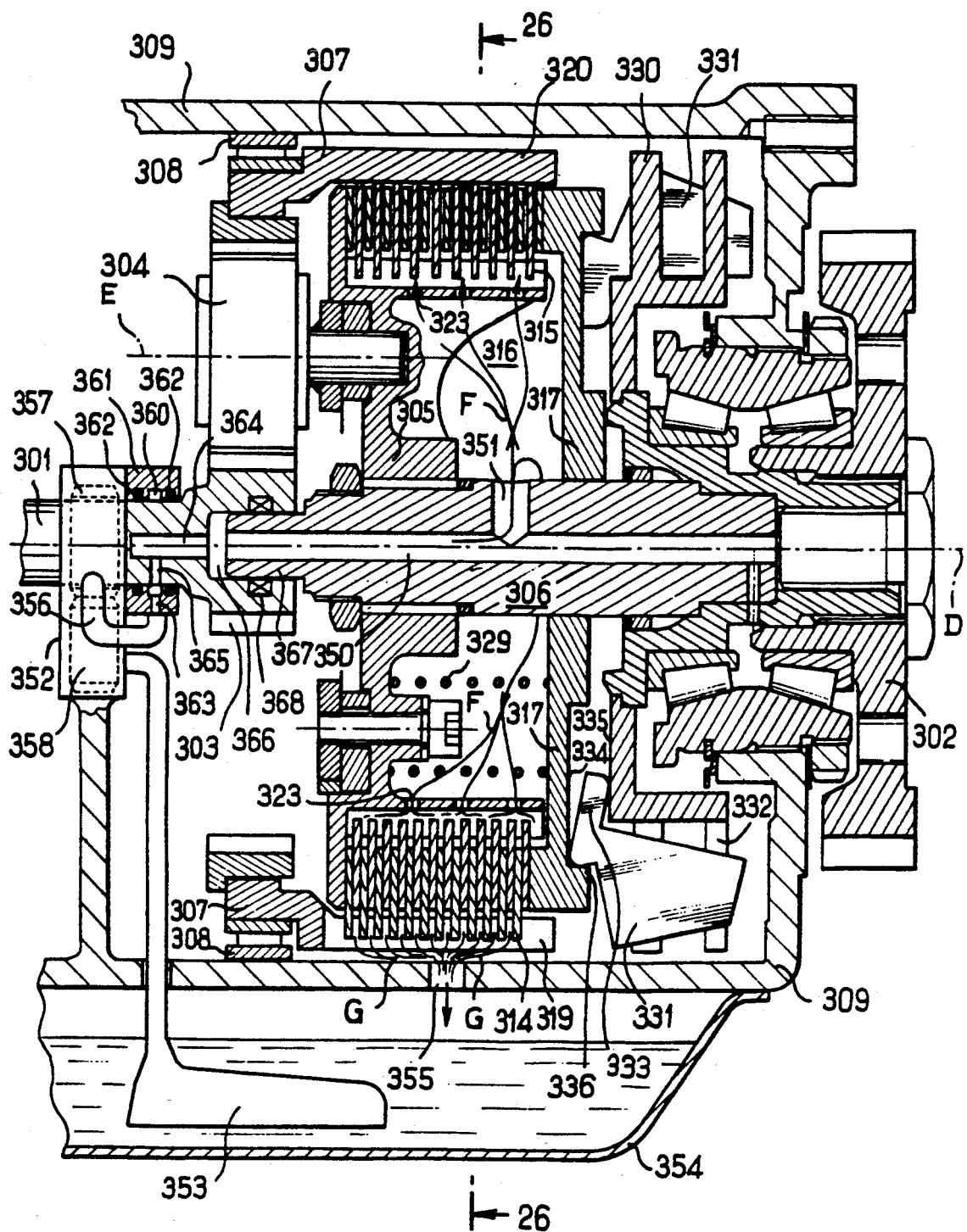
FIG. 26 is an axial section view of a transmission with a multidisk clutch according to a seventh embodiment of the invention.

The automatic transmission shown in FIG. 26 comprises a combination of gears defining different transmission ratios between an input shaft 301 adapted to be connected to an engine by means of a clutch (not shown) and an output 302 adapted to be coupled to drive wheels (not shown) of a vehicle in the same manner as in FIG. 20.

The transmission is contained in a housing 309 with an oil pan 354 at the bottom containing oil for lubricating the movable parts of the transmission.

In the embodiment shown in FIG. 26, the combination of gears comprises a planetary or epicyclic train. A sun gear 303 is rigidly connected to the input shaft 301 so as to be driven by rotation of the input shaft 301. The sun gear 303 meshes with planet gears 304 mounted on a planet carrier 305. The latter is fixed to a central shaft 306 connected to the output 302 and having the same axis of rotation D as the input shaft 301. There can be provided, for example, three planet gears 304 (only one of which is shown in FIG. 2) which are pivotally mounted about three axes E which are distributed about the axis D. The teeth of the planet gears 301 also mesh with the inner teeth of a ring gear 307, which is centered for rotation about axis D.

As explained above, the transmission ratio between the input 301 and the output 302 depends upon mechanical couplings which are achieved between the rotary elements (sun gear 303, planet carrier 305, and ring gear 307) of the planetary train. In the embodiment shown, these mechanical couplings are selectively performed between the planet carrier 305 and the ring gear 307. A free wheel 308, mounted between the stationary housing 309 of the transmission and the outer edge of the ring gear 307, prevents the ring gear 307 from rotating in a reverse direction with respect to the input shaft 301.

A multidisk clutch is mounted between the ring gear 307 and the planet carrier 305 for providing selective coupling between these two rotary elements. This clutch comprises a stack of first annular disks 314 which are interleaved withe second annular disks 315. First and second disks 314, 315 are axially slidable and alternately connected for common rotation with the ring gear 307 and with the planet carrier 305. The disks 314, 315 are arranged in planes perpendicular to the direction D. The stacked arrangement of the annular disks creates a peripheral wall for a chamber 316. The chamber 316 is defined in the axial direction by the planet carrier 305 and by a solid clamping plate 317 which will be described later. The central shaft 306 connected to the planet carrier 305 extends through the chamber 316.

First disks 314 of the stack are connected for common rotation with the ring gear 307. To this end, said disks 314 are provided on their external edges with external teeth 318 which are seated in openings 319 between spline-like fingers 320 extending parallel to axis D towards the output 302. The fingers 320 are arranged at equal angular intervals along the periphery of the ring gear 307 and allow axial sliding of the disks 314 with respect to the ring gear 307 (see FIG. 27).

Figure 27:
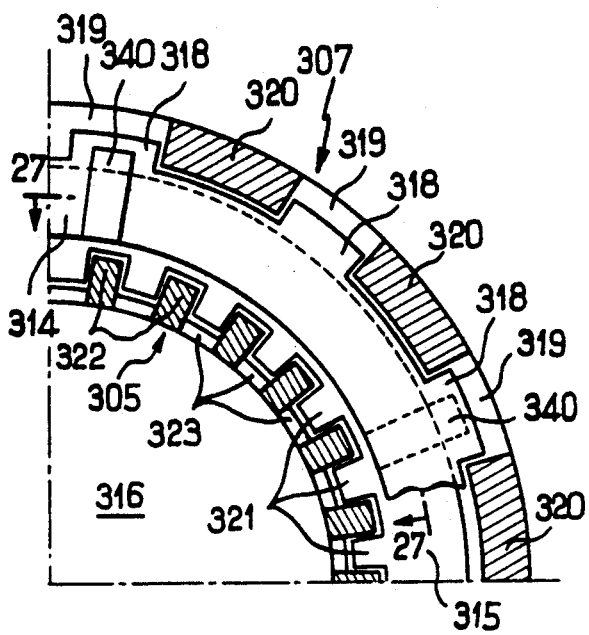
FIG. 27 is a partial view, in section, of the clutch along the line 26—26 of FIG. 26.

Second disks 315 of the stack, each of which is located between two first disks 314, are connected for common rotation with the planet carrier 305. To this end, said second disks are provided on their inner edge with inner teeth 321 which are seated between external splines 322 extending parallel to axis D on the planet carrier 305 (FIG. 27). The inner wall of the planet carrier between the external splines 322 has orifices 323 therethrough. The splines 322 are directed towards the output 302 and allow for axial sliding of the disks 315 with respect to the planet carrier 305.

The stack of disks 314, 315 can be selectively clamped by a mechanism mounted on the central shaft 306. Said mechanism (FIG. 26) comprises the clamping plate 317 (which axially limits one side of the chamber 316), biasing springs 329, centrifugal weights 331, and a carrier 330 for the weights. The carrier 330 is fixed to the central shaft 306, whereas the clamping plate 317 is connected for common rotation with the shaft 306 but is axially slidable thereon.

The periphery of the surface of the clamping plate 317 adjacent the chamber 316 is in contact with a second disk 315 forming one end of the stack, whereas a first disk 314 forming the other end of the stack is in contact with the planet carrier 305. Thus, when the clamping plate 317 is axially urged towards the planet carrier 305 with a sufficient thrust, the stack of disks 314, 315 is clamped, and the ring gear 307 and the planet carrier 305 are coupled together.

The biasing springs 329 (only one of which is shown in FIG. 26) are mounted in the chamber 316 between the planet carrier 305 and the clamping plate 317. The thrust produced by said springs 329 tends to urge the clamping plate 317 axially away from the planet carrier 305, and thus to untighten the stack of disks 314, 315.

The weights 331 are mounted in slits 332 provided at the periphery of the carrier 330. Each weight 331 comprises a nose 333 operating as a cam defining the spacing between the surface 334 of the plate 317 away from the chamber 316 and a surface 335 of the carrier 330 which faces said surface 334, both faces 334, 335 being parallel to each other and perpendicular to the axis D.

If the speed of rotation of the planet carrier 305 and its shaft 306 is low or even equal to zero, the weights 331 are in the rest position adjacent the bottom of the respective slits 332, as shown in the upper part of FIG. 26. When this speed of rotation increases, the weights 331 leave their rest position under the action of centrifugal force. The noses 333 of the weights are retained by a projection 336 at the periphery of the surface 334 of the clamping plate 317, whereby the weights 331 pivot as shown in the lower part of FIG. 26. As a consequence of this pivotal movement, the noses 333 of the weights 331 increase the axial separation of the clamping plate 317 from the carrier 330. Since the carrier 330 is rigidly connected to the central shaft 306, the clamping plate 317 is urged towards the planet carrier 305 against the action of the biasing springs 329.

Thus, above a predetermined speed of rotation of the planet carrier 305, the stack of disks 314, 315 is clamped and tends to provide a coupling between the ring gear 307 and the planet carrier 305. However, for example when the torque applied to the input shaft abruptly increases while the stack of disks 314, 315 is clamped under the effect of a speed of rotation of the planet carrier 305 which remains stable, friction can appear between the disks 314, 315 of the stack.

For preventing excessive heating of disks 314, 315 due to such a friction, the invention further provides for oil circulation between the disks 314, 315.

More specifically, some of the disks 314, 315 have grooves 340 on at least one of two opposed friction faces 343. The grooves 340 define oil passages through the peripheral wall which is provided by the stack of disks 314, 315 for the chamber 316. In the embodiment shown in FIGS. 27 and 28, said grooves 340 are provided on each friction face 343 of the first disks 314 which are connected for common rotation with ring gear 307. Said grooves 340 extend radially from the inner edge and terminate on external teeth 318 of each first disk 314, beyond the external edges of the adjacent second disks 315. To avoid weakening the first disks 314, the grooves 340 are offset on one face of each disk 314 with respect to the other face. Moreover, to avoid weakening the external teeth 318, the grooves 340 terminate short of the outer ends of teeth 318.

Figure 28:
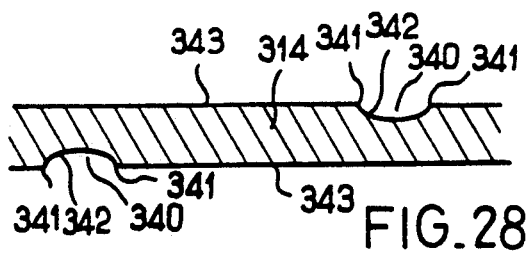
FIGS. 28-30 are views of three alternative embodiments of an externally toothed disk, taken in section along line 27—27 of FIG. 27.

The cross-sectional profile of the grooves 340 may be curved, as shown in FIG. 28. Also as shown in FIG. 28, along the longitudinal edges 341 of each groove 340, the surface 342 defining said groove 340 is connected by an obtuse angle with the friction surface 343 in which the groove 340 is formed.

Referring again to FIG. 26, the central shaft 306 connected to the planet carrier 305 comprises an axial duct 350 and at least one radial bore 351 at a location where the central shaft 306 extends through the chamber 316. The radial bore 351 extends between the lateral wall of the axial duct 350 and the chamber 316. The duct 350 and bore 351 are operable for introducing oil into the chamber 316. The oil fills the chamber 316 and flows through the orifices 323 or by the free axial end of the splines 322, as indicated by the arrows F, and then through the passages defined by the grooves 340 in the peripheral wall provided by the stack of disks 314, 315. Thereafter, the oil arrives in the housing 309 outside the ring gear 307 through the spaces 319 between the spline fingers 320, as indicated by the arrows G. From there, the oil returns to the oil-pan 354 through an aperture 355 in the housing 309.

To supply the chamber 316 with oil by way of the duct 350, it is possible to provide a pump 352, for example a gear pump having gears 357, 358. In the embodiment shown in FIG. 26, an oil intake 353 picks up oil in the oil-pan 354 located underneath the housing 309. The pump 352 delivers the oil picked up by the intake 353 under pressure into an outlet tubing 356. The pump 352 is driven by the input shaft 301 of the transmission (one gear 357 of the pump 352 is mounted on the input shaft 301).

The output tubing 356 of the pump 352 is connected to an annular chamber 360 which is machined on the inner wall of a stationary ring 361 in which the input shaft 301 is pivotally mounted. Two packings 362 provide leaktightness between the input shaft 301 and the rings 361 on either side of the annular chamber 360. A radial orifice 363 extends in the ring 361 between the annular chamber 360 and the connection with the tubing 356 for feeding pressurized oil into the chamber 360.

An axial duct 364 is provided adjacent the end of the input shaft 301 adjacent the sun gear 303. The axial duct 364 communicates with the annular chamber 360 of the ring 361 through a radial bore 365. The axial duct 364 opens into a cylindrical recess 366 provided at the end of the input shaft 301 adjacent the sun gear 303. The cylindrical recess 366 pivotally receives a cylindrical extension 367 of the central shaft 306, in which the axial duct 350 of the shaft 306 terminates. An annular packing 368 provides leaktightness between the recess 366 and the extension 367.

Thus, the pressurized oil from the pump 352 reaches the oil chamber 316 of the multidisk clutch by successively traveling through the tubing 356, the radial orifice 363, the annular chamber 360, the radial bore 365, the axial duct 364 of the input shaft 301, the axial duct 350 of the central shaft 306, and the radial bore 351 to obtain the desired lubrication between the friction faces of the disks 314, 315 of the clutch.

When the multidisk clutch is clamped with a sufficient force for coupling the ring gear 307 and the planet carrier 305, the planets 304 do not roll on the inner teeth of the ring gear 307 and thus can no longer roll on the sun gear 303. The output 302 of the transmission is then in direct drive with the input shaft 301 (transmission ratio equal to 1).

When the multidisk clutch is released, the load connected to the output 302 tends to limit the speed of rotation of the planet carrier 305 and the rolling of the planets 304 tends to produce reverse rotation of the ring gear 307, but the free wheel 308 prevents such a reverse rotation. When the ring gear 307 is thus blocked by the free wheel 308, the transmission ratio between the input 301 and the output 302, is defined by the ratio between the radii of the sun gear 303 and the planets 304 and is lower than 0.5.

The multidisk clutch shifts between both ratios in a progressive manner, thanks to slippage between the disks 314, 315.

Figure 29:
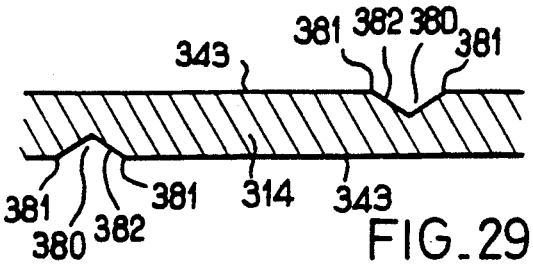
Figure 30:
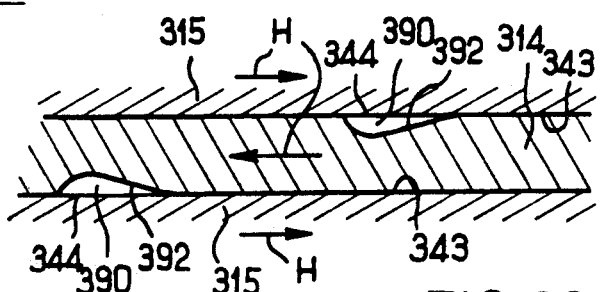

FIGS. 29 and 30 show sectional views of modified embodiments of the profile of the grooves formed in the friction faces 343 of the disks 314.

The grooves 390 shown in FIG. 30 are defined by surfaces 392 each of which defines a wedge-shaped volume with the plane friction face 344 of the adjacent disk 315. When the grooved plane friction face 344 moves relative to the second disks 315 in the direction indicated by the arrows H, this wedge-shaped profile of the grooves 390 promotes a better lubrication of the friction faces 343, 344.

Figure 31:
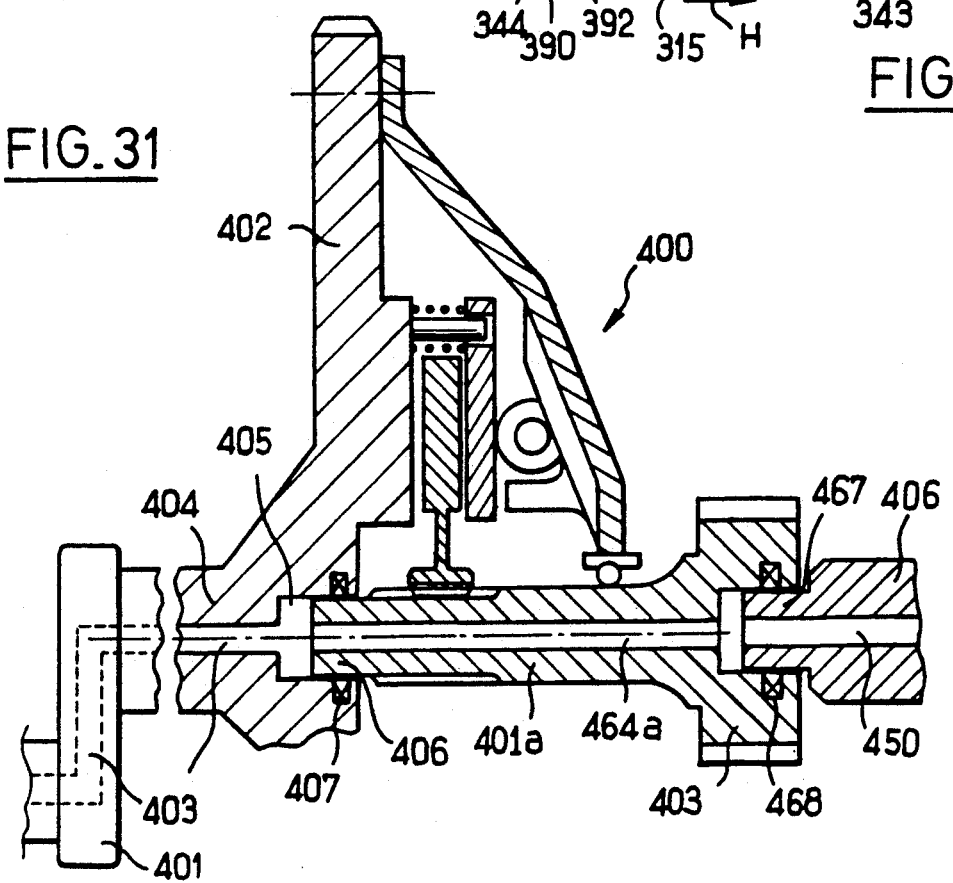
FIG. 31 is a partial view, in axial section, of an eighth embodiment of the invention.

FIG. 31 partially shows a modification to the embodiment of FIG. 26 for use with a transmission that has no pump for delivering oil under pressure to the chamber 316. In this modified embodiment, a centrifugal clutch 400 of a known type provides coupling or uncoupling between an engine crankshaft 401 and a transmission (not further shown).

The centrifugal clutch 400 is mounted on a flywheel 402 connected to the crankshaft 401. As is usual, the crankshaft 401 comprises an internal duct 403 in which the pressurized oil of the engine circulates for lubricating the bearings of the crankshaft and the bearings of the piston rods. In the embodiment shown by FIG. 31, this internal duct 403 is extended to the hub 404 of the flywheel 402. The end of the hub 404 is provided with a cylindrical recess 405 pivotally receiving an end 406 of the input shaft 401a of the transmission. A packing ring 407 provides leaktightness between the recess 405 and the end 406 of the shaft 401a. An axial duct 464a provided within the input shaft 401a of the transmission communicates (just as the duct 364 of FIG. 26 adjacent the sun gear 303 in FIG. 26) with an oil injection duct 450 of a central shaft 406. This axial duct 464a extends all along the input shaft 401a so as to reach its end 406 adjacent the flywheel 402.

The arrangement illustrated in FIG. 31 thus can deliver the pressurized oil circulating in the duct 403 of the engine crankshaft to an oil chamber 316 as shown in FIG. 26. This modified embodiment supplies lubricant to the multidisk clutch without any need for a supplemental oil pump.

The invention, of course, is not limited to the embodiments described and represented, and the different systems described can be combined differently with one another. Other modifications to the described embodiments will appear to one skilled in the art reading this disclosure.

For example, in the embodiment of FIG. 26, the function of the springs 329 can be replaced or assisted by the axial thrust, having the same direction, and which is generated in the output gears 304 if their teeth are helicoidal. In this case, the clamping plate 317 is fixed to the ring gear 307 and is separated from the weights 331 by a resilient means providing the initial clamping when there is no engine torque (for preventing the ring gear 307 from rotating faster than the sun gear 303 when the engine operates for retarding the vehicle).

Another possibility is to provide an axial thrust bearing between the ring gear 307 and the clamping plate 317, whereby the axial thrust generated in the helicoidal teeth of the ring gear 307 is applied to the clamping plate 317 in addition to, or in replacement of, the force of the springs 329.

One can also, for example, install a device according to FIG. 5 at the input of a manually operated gear box.

I claim:

1. A transmission apparatus having at least one transmission device comprising:
   a housing,
   an input element,
   an output element,
   power conveying elements interconnecting the input and output elements and having intermeshed helical teeth, said power conveying elements comprising an axially displaceable element which is axially displaceable under an axial thrust produced by helical meshing of said intermeshed helical teeth under load, friction coupling means actuatable between a coupling condition and an uncoupling condition for respectively coupling and uncoupling one of the power conveying elements with another of said elements, such that said helical meshing occurs under load when the friction coupling means are in the uncoupling condition and under at least partly canceled load when the friction coupling means are in the coupling condition, said friction coupling means, when in the coupling condition, being capable of transmitting a torque which is an increasing function of an engaging force applied to said friction coupling means, means for transmitting axial displacement of the axially displaceable element to the coupling means thereby to urge said coupling means toward said uncoupling condition, urging means for applying said engaging force to the coupling means to urge the coupling means towards the coupling condition, and overrunning means which are operatively mounted between the housing and an intermediate power conveying element which belongs to said power conveying elements and is rotatable with respect to the input element and to the output element, for preventing reverse rotation of said intermediate power conveying element when the coupling means are in the uncoupling condition.

2. A transmission apparatus according to claim 1 wherein said intermediate power conveying element, said axially displaceable element and said other element are three distinct elements.

3. A transmission apparatus according to claim 1 or 2, wherein said axially displaceable element is said one power conveying element.

4. A transmission apparatus according to claim 3, wherein said urging means are adapted to apply the engaging force to the axially displaceable element.

5. A transmission apparatus according to claim 1 wherein said urging means are tachometric urging means.

6. A transmission apparatus according to claim 5, further comprising a two-speed transmission device having an output which is connected to said input element.

7. A transmission apparatus according to claim 1 or 5, comprising at least two said transmission devices, with the output element of a first one of said transmission devices being connected to the input element of a second one of said transmission devices.

8. A transmission apparatus according to claim 1, wherein said helical meshing is completely unloaded when the coupling means are in the coupling condition.

9. A transmission apparatus according to claim 1 wherein said uncoupling condition corresponds to a lower transmission ratio of the transmission device.

10. A transmission apparatus according to claim 9, comprising a second transmission device having an input which is connected to said output element, said second transmission device being responsive to a speed in said second transmission device for automatically shifting up, and to a torque transmitted in said second transmission device for automatically shifting down.

11. A transmission apparatus according to claim 10, wherein said urging means are adapted to produce a substantially constant engaging force.

12. A transmission apparatus according to claim 10, wherein said urging means comprise means for developing a substantially constant engaging force component and means for adding to said force component a supplemental force component increasing with rotational speed.

13. A transmission apparatus according to claim 1, wherein the power conveying elements are arranged as a differential device.

14. A transmission apparatus according to claim 1, comprising at least two said transmission devices, with the output element of a first one of said transmission devices being connected to the input element of a second one of said transmission devices, wherein the urging means of the first transmission device apply an engaging force having at least a substantial constant force component, and the urging means of the second transmission device apply an engaging force which is essentially dependant upon a rotating speed in the second transmission device.

15. A transmission apparatus having at least one transmission device comprising:

a housing, an input element, an output element, power conveying elements interconnecting the input and output elements and having intermeshed helical teeth, said power conveying elements comprising an axially displaceable element which is axially displaceable under an axial thrust produced by helical meshing of said intermeshed helical teeth under load, friction coupling means actuatable between a coupling condition and an uncoupling condition for respectively coupling and uncoupling one of the power conveying elements with another of said elements thereby to selectively shift the transmission device between two transmission ratios, means for transmitting axial displacement of the axially displaceable element to the coupling means thereby to urge said coupling means towards a first one of said coupling and uncoupling conditions corresponding to a lower one of said transmission ratios, tachometric urging means for variably urging the coupling means towards a second one of the coupling and uncoupling conditions corresponding to a higher one of said transmission ratios, and overrunning means which are operatively mounted between the housing and an intermediate power conveying element which belongs to said power conveying elements and is rotatable with respect to the input element and to the output element, for preventing reverse rotation of said intermediate power conveying element when the coupling means are in the uncoupling condition.

16. A transmission apparatus according to claim 15, wherein said intermediate power conveying element, said axially displaceable element and said other element are three distinct elements.

17. A transmission apparatus according to claim 15, further comprising a two-speed transmission device having an output which is connected to said input element.

18. A transmission apparatus according to claim 17 wherein said uncoupling condition corresponds to the lower transmission ratio of the transmission device.

19. A transmission apparatus according to claim 15 or 16, wherein said axially displaceable element is said one power conveying element.

20. A transmission apparatus according to claim 19, wherein said urging means are adapted to apply the engaging force to the axially displaceable element.

21. A transmission apparatus according to claim 15, wherein the power conveying elements are arranged as a differential device.

22. A transmission apparatus according to claim 15, comprising at least two said transmission devices, with the output element of a first one of said transmission devices being connected to the input element of a second one of said transmission devices.

23. A transmission apparatus having at least one transmission device comprising:
a housing,
an input element,
an output element,
power conveying elements adapted to interconnect under at least two different transmission ratios the input and output elements, and having intermeshed helical teeth, said power conveying elements comprising an axially displaceable element which is axially displaceable under an axial thrust produced by helical meshing of said intermeshed helical teeth,
friction coupling means for selectively coupling for common rotation said axially displaceable element and another of said elements,
means for transmitting axial displacement of said axially displaceable element under said axial thrust to said coupling means thereby to urge said coupling means into one of a coupling and an uncoupling condition; and
centrifugal means driven for common rotation by one of said elements of the transmission device and mounted for variably urging said axially displaceable element in a direction counteracting said axial thrust.

24. A transmission apparatus according to claim 23, wherein said one condition of the coupling means corresponds to a lower transmission ratio of the transmission device.

25. A transmission apparatus according to claim 23 or 24, wherein said one condition of the coupling means is the uncoupling condition.

26. A transmission apparatus according to claim 23, wherein a backing member of the coupling means is axially connected to said other element.

27. A transmission apparatus according to claim 26, wherein said backing member is rigidly secured to said other element.

28. A transmission apparatus according to claim 23, wherein said means for transmitting axial displacement are a rigid connection between said axially displaceable element and a pressing member of said friction coupling means.

29. A transmission apparatus according to claim 23, wherein said one element of the transmission device is said axially displaceable element.

30. A transmission apparatus according to claim 23, wherein said one element of the transmission device is the output element and is a planet carrier carrying planets meshing with a ring gear and a sun gear, wherein the axially displaceable element is one of said ring gear and sun gear and is urged by the centrifugal means by way of a thrust bearing.

31. A transmission apparatus according to claim 23, comprising at least two said transmission devices, with the output element of a first one of said transmission devices being connected to the input element of a second one of said transmission devices.

32. A transmission apparatus comprising:
an input shaft, an intermediate shaft and an output shaft;
an input transmission device mounted between the input shaft and the intermediate shaft and selectively shiftable between a lower transmission ratio and a higher transmission ratio; and
an output transmission device mounted between the intermediate shaft and the output shaft, and comprising torque-responsive means tending to automatically shift down said output transmission unit, and speed-responsive means tending to automatically shift up said output transmission device.

33. A transmission apparatus according to claim 32, wherein the input transmission device comprises torque-responsive means for automatically shifting said input transmission device into a lower transmission ratio when a torque applied to the input shaft exceeds a predetermined threshold and into a higher transmission ratio when said torque is equal to or lower than said threshold.

34. A transmission apparatus according to claim 32, wherein the speed responsive means are centrifugal means.

35. A transmission apparatus comprising a succession of at least two similar modules connected together in series by at least one intermediate element being an output element for one of the modules and an input element for the other of said modules, wherein each module is essentially self-controlled and comprises means for selectively defining two different transmission ratios, torque-responsive means tending to automatically shift down said module responsive to a torque present in said module, and speed-responsive means tending to automatically shift up said module responsive to a speed present in said module.

36. A transmission apparatus having at least one transmission device comprising:
a housing element,
an input element,
an output element,
power conveying elements interconnecting the input and output elements and having intermeshed helical teeth, said power conveying elements comprising an axially displaceable element which is axially displaceable under an axial thrust produced by helical meshing of said intermeshed helical teeth under load,
friction coupling means actuatable between a coupling condition and an uncoupling condition for respectively coupling and uncoupling one of the power conveying elements with another of said elements, such that said helical meshing occurs under load when the coupling means are in the coupling condition and under at least partly canceled load when the friction coupling means are in the uncoupling condition, said friction coupling means, when in the coupling condition, being capable of transmitting a torque which is an increasing function of an engaging force applied to said friction coupling means, means for transmitting axial displacement of the axially displaceable element to the coupling means thereby to apply to said coupling means said axial thrust as a first component of said engaging force urging the coupling means towards said coupling condition, and tachometric urging means for applying a second component of said engaging force urging the coupling means towards the coupling condition.

37. A transmission apparatus according to claim 36, in which said one power conveying element is an intermediate power conveying element which is rotatable with respect to the input element and to the output element, and said other element is said housing element.

38. A transmission apparatus according to claim 37, wherein said intermediate power conveying element is said axially displaceable element.

39. A transmission apparatus according to claim 36, wherein said coupling means, when in the uncoupling condition, allow free relative rotation between the input element and the output element.

40. A transmission apparatus according to claim 36 or 37, comprising a second transmission device having the same input element as said one transmission device and having a differential arrangement of power conveying elements in which an intermediate power conveying element is rotatable with respect to said input element and to an output element of the second transmission device and is locked against reverse rotation by overrunning means, wherein the output element of said one transmission device is connected to said intermediate power conveying element of said second transmission device, and wherein said coupling means, in the uncoupling condition, allow free relative rotation between the input element and the output element of said one transmission device.

41. A transmission apparatus according to claim 40, wherein the output element of said one transmission device is connected to the intermediate power conveying element of the second transmission device by an overrunning means allowing the intermediate power conveying element of the second transmission device to rotate faster than the output element of the first transmission device, and wherein the second transmission device comprises a direct drive clutch which, when engaged, establishes direct drive between the input element and the output element of the second transmission device, whereby the intermediate power conveying element is driven faster than the output element of the first transmission device.

42. A transmission apparatus having at least one transmission device comprising:

a housing element,
an input element,
an output element,
power conveying elements interconnecting the input and output elements and having intermeshed helical teeth, said power conveying elements comprising an axially displaceable element which is axially displaceable under an axial thrust produced by helical meshing of said intermeshed helical teeth under load,
friction coupling means actuatable between a coupling condition and an uncoupling condition for respectively coupling and uncoupling one of the power conveying elements with another of said elements, such that said helical meshing occurs under load when the coupling means are in the coupling condition and under at least partly canceled load when the friction coupling means are in the uncoupling condition, said friction coupling means being, when in the coupling condition, capable of transmitting a torque which is an increasing function of an engaging force applied to said friction coupling means, means for transmitting axial displacement of the axially displaceable element to the coupling means thereby to apply to said coupling means said axial thrust as said engaging force urging the coupling means towards said coupling condition, and friction initiating means for producing in the friction coupling means, when in the uncoupling condition, a friction torque loading said helical meshing, thereby to initiate said axial thrust.

43. A transmission apparatus according to claim 42, in which the means for initiating friction include an oil bath in which the friction coupling means operate.

44. A transmission apparatus according to claim 42, in which said one power conveying element is an intermediate power conveying element which is rotatable with respect to the input element and to the output element, and said other element is said housing element.

45. A transmission apparatus according to claim 42 wherein said intermediate power conveying element is said axially displaceable element.

46. A transmission apparatus according to claim 42, wherein said coupling means, when in the uncoupling condition, allow free relative rotation between the input element and the output element.

47. A transmission apparatus according to claim 46, wherein said friction initiating means are responsive to relative speed between said one power conveying element and said other element for increasing frictional torque when said relative speed increases.

48. A transmission apparatus according to claim 46 or 47, wherein said friction coupling means, when engaged, define a low transmission ratio between the input element and the output element, and wherein said transmission device comprises means for disabling the friction coupling means when a direct drive clutch means connecting for common rotation the input element and the output element is activated.

49. A mechanical automatic transmission that is directly responsive to torque, the transmission comprising:

a stationary housing;
an input device including an input shaft mounted in the housing for limited axial translation and also for rotation in a preselected direct sense in response to a driving torque;
an output device including an output shaft rotatably mounted in the housing for connection to a driven load;
a first planetary train of helical gears mounted in the housing and including a first sun gear fixed to the input shaft, a first ring gear, a first planet carrier, and at least one planet gear mounted on the first planet carrier and meshing with the first sun gear and first ring gear;
a first clutch having a driving member fixed to the first ring gear and a driven member fixed to the first planet carrier, the first clutch being selectively movable between a disengaged position in which relative rotation between the gears of the first planetary train is permitted and an engaged position in which relative rotation between the gears of the first planetary train is prevented;

means for urging the first clutch toward the disengaged position in response to relative axial movement between two gears of the first planetary train generated by imposing a driving torque between said two gears of the first planetary train;

means for urging the first clutch toward the engaged position so that the input shaft is directly coupled to the output device by preventing relative rotation between the first sun gear and first planet gears;

a second planetary gear train mounted in the housing and including a second sun gear, a second ring gear, a second planet carrier fixed to the first ring gear, and at least one planet gear mounted on the second planet carrier and meshing with the second sun gear and second ring gear;

a second clutch having a driving element fixed to the input shaft and a driven element fixed to the second sun gear and selectively movable between a disengaged position in which the second sun gear is free to rotate idly and an engaged position in which the second sun gear is rotatively coupled to the input shaft;

means for urging the second clutch toward the disengaged position including means responsive to relative axial movement between two gears of the first planetary train generated by imposing a driving torque between said two gears of the first planetary train;

means rotatively coupled to the input shaft for urging the second clutch toward the engaged position in which torque is transmitted from the input shaft to the first ring gear through the second sun gear and the second planet carrier; and means for preventing rotation of the first and second ring gears relative to the housing in a sense reverse to the direct sense.

50. A transmission according to claim 49 wherein the means for urging the second clutch toward the engaged position comprises a centrifugal means that produces increasing engaging force in response to increasing rotational speed of the input shaft.

51. A transmission according to claim 49 or 50 wherein the means for preventing reverse rotation of the first and second ring gears comprise first and second free wheels mounted respectively between the first and second ring gears and the housing.

52. A transmission according to claim 49 wherein the means for urging the first clutch toward the engaged position comprises a centrifugal means rotatively coupled to the output device and mounted for generating an increasing force urging the first clutch toward the engaged position in response to increasing rotational speed of the output shaft.

53. A mechanical automatic transmission that is directly responsive to torque, the transmission comprising:

a stationary housing;

an input device including an input shaft mounted in the housing for limited axial translation and also for rotation in a preselected direct sense in response to a driving torque;

an output device including an output shaft rotatably mounted in the housing for connection to a driven load;

a first planetary train of helical gears mounted in the housing and including a first sun gear rotatively connected to the input shaft, a first ring gear, a first planet carrier, and at least one planet gear mounted on the first planet carrier and meshing with the first sun gear and first ring gear;

a first clutch for selectively coupling together two of the gears of the first planetary train by movement between a disengaged position in which relative rotation between the gears of the first planetary train is permitted and an engaged position in which relative rotation between the gears of the first planetary train is prevented;

means for urging the first clutch toward the disengaged position in response to relative axial movement between two gears of the first planetary train generated by imposing a driving torque between said two gears of the first planetary train;

means for urging the first clutch toward the engaged position so that the input shaft is directly coupled to the output device;

a second planetary gear train mounted in the housing and including a second sun gear, a second ring gear, a second planet carrier fixed to the first ring gear, and at least one planet gear mounted on the second planet carrier and meshing with the second gear and second ring gear;

means rotatably coupling the second planet carrier to the first ring gear such that the planet carrier cannot rotate in the direct sense faster than the first ring gear;

a second clutch for selectively coupling one of the second sun gear and the second ring gear respectively to one of the input shaft and the housing by movement between a disengaged position and an engaged position;

means for urging the second clutch toward the disengaged position including means responsive to relative axial movement between two gears of one of the first and second planetary trains generated by imposing a driving torque between said two gears of the one planetary train;

means rotatively coupled to the input shaft for urging the second clutch toward the engaged position in which torque is transmitted from the input shaft to the first ring gear through the second sun gear and the second planet carrier; and means for preventing rotation of the first ring gear relative to the housing in a sense reverse to the direct sense.

54. A transmission according to claim 53 wherein the second clutch selectively couples the second ring gear to the housing.

* * * * *